(12) United States Patent
Ehara et al.

(10) Patent No.: US 11,901,736 B2
(45) Date of Patent: Feb. 13, 2024

(54) SERVER AND POWER MANAGEMENT SYSTEM

(71) Applicant: TOYOTA JIDOSHA KABUSHIKI KAISHA, Toyota (JP)

(72) Inventors: Masato Ehara, Gotemba (JP); Daiki Yokoyama, Gotemba (JP); Yuki Takahashi, Susono (JP); Tomoya Takahashi, Ebina (JP); Tomoyuki Kubota, Susono (JP); Sachio Toyora, Gotemba (JP); Keisuke Fukuoka, Fujieda (JP); Zidan Xu, Yokohama (JP); Wenfeng Liang, Yokohama (JP); Hiroki Murata, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/056,784

(22) Filed: Nov. 18, 2022

(65) Prior Publication Data
US 2023/0246447 A1     Aug. 3, 2023

(30) Foreign Application Priority Data

Feb. 3, 2022   (JP) .................................. 2022-015691

(51) Int. Cl.
*H02J 3/32*     (2006.01)
*H02J 50/10*    (2016.01)
*B60L 55/00*    (2019.01)

(52) U.S. Cl.
CPC .............. *H02J 3/322* (2020.01); *B60L 55/00* (2019.02); *H02J 50/10* (2016.02)

(58) Field of Classification Search
CPC ............ H02J 3/322; H02J 50/10; B60L 55/00
USPC ........................................................ 307/10.1
See application file for complete search history.

(56) References Cited

U.S. PATENT DOCUMENTS

| 2020/0231057 | A1* | 7/2020 | Hishida | ............ | H02J 13/00006 |
| 2020/0231063 | A1* | 7/2020 | Sadano | ................... | H02J 3/144 |
| 2020/0298721 | A1* | 9/2020 | Hishida | ................... | B60L 53/60 |
| 2021/0331600 | A1* | 10/2021 | Hishida | ................... | B60L 53/63 |

FOREIGN PATENT DOCUMENTS

JP       2015-095983 A     5/2015

* cited by examiner

*Primary Examiner* — Alfonso Perez Borroto
(74) *Attorney, Agent, or Firm* — Finnegan, Henderson, Farabow, Garrett & Dunner, LLP

(57) ABSTRACT

A server manages plural vehicles each configured to be able to participate in a DR. A first vehicle is able to transmit power through a power cable. A second vehicle is able to transmit power in a non-contact manner while being stationary. A third vehicle is able to transmit power in a non-contact manner while traveling. The server includes a communication device and a processing device. The communication device is able to transmit a DR signal to each of the vehicles. The processing device selects a target vehicle, to which the DR signal is to be transmitted, from the vehicles in accordance with the priority degree for participation in the DR. The processing device sets the priority degree of the first vehicle to be higher than that of the second vehicle, and sets the priority degree of the second vehicle to be higher than that of the third vehicle.

14 Claims, 14 Drawing Sheets

| | 50A (CASE A) | | 50B (CASE B) | | 50C (CASE C) |
|---|---|---|---|---|---|
| POWER TRANSMISSION EFFICIENCY | PTE1 | > | PTE2 | > | PTE3 |
| POWER LOSS L | LA | < | LB | < | LC |

| ID | DR PERIOD | | | | | P2 | ... |
|---|---|---|---|---|---|---|---|
| | P1 | | | | | | |
| | CON-TACT | NON-CONTACT WHILE BEING STATIONARY | NON-CONTACT WHILE TRAVELING | DR AMOUNT dra | PRIORITY DEGREE p | ... | ... |
| RS1(50a) | YES | YES | YES | a | pa | ... | ... |
| RS2(50b) | YES | YES | NO | b | pb | ... | ... |
| RS3(50c) | YES | NO | YES | c | pc | ... | ... |
| RS4(50d) | YES | NO | NO | d | pd | ... | ... |
| RS5(50e) | NO | YES | YES | e | pe | ... | ... |
| RS6(50f) | NO | YES | NO | f | pf | ... | ... |
| RS7(50g) | NO | NO | YES | g | pg | ... | ... |
| RS8(50h) | NO | NO | NO | h | ph | ... | ... |
| ... | ... | ... | ... | ... | ... | ... | ... |

671 — 672 — 673 — 675

FIG. 11
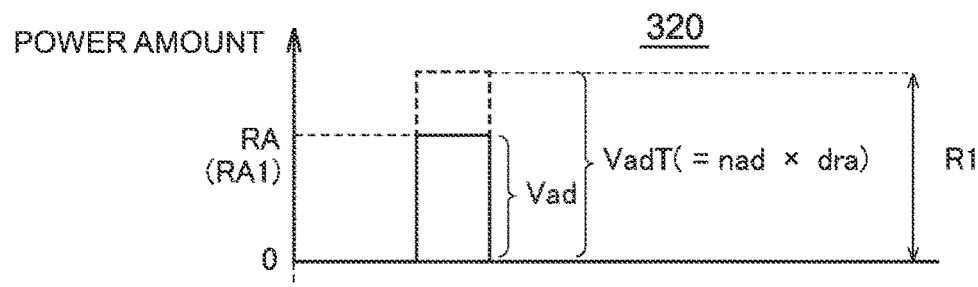
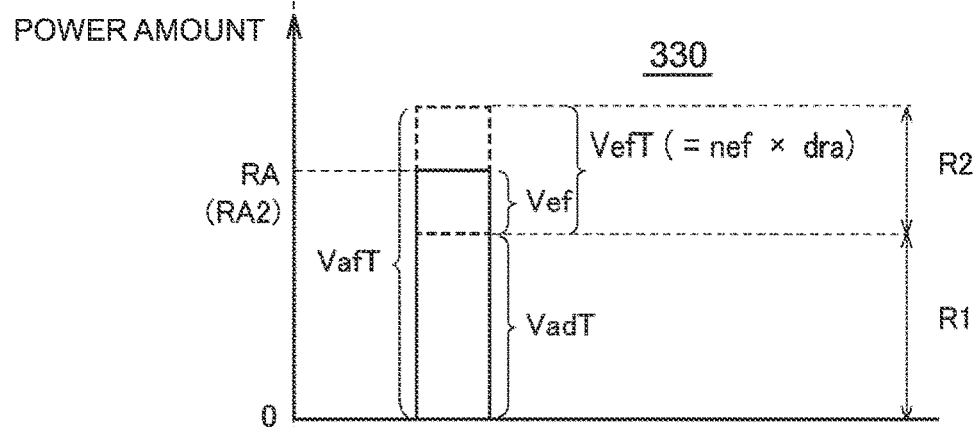
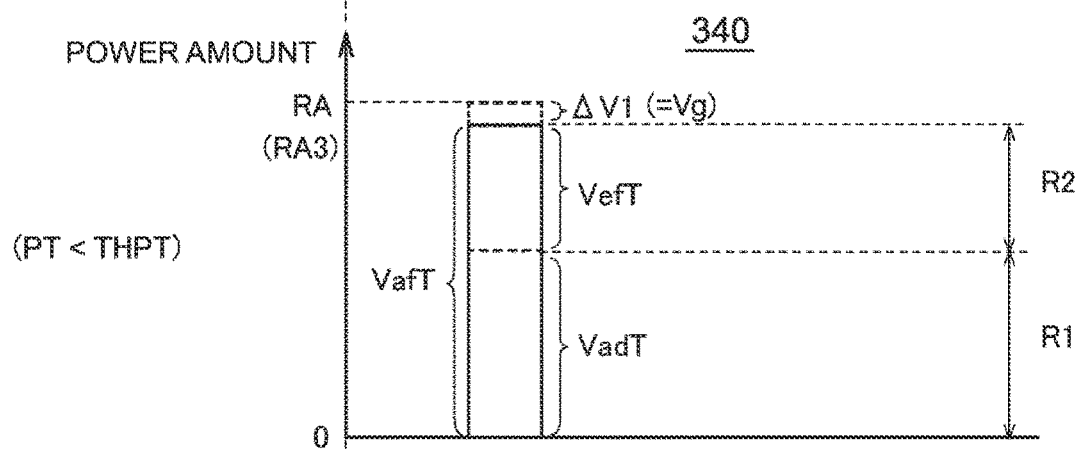
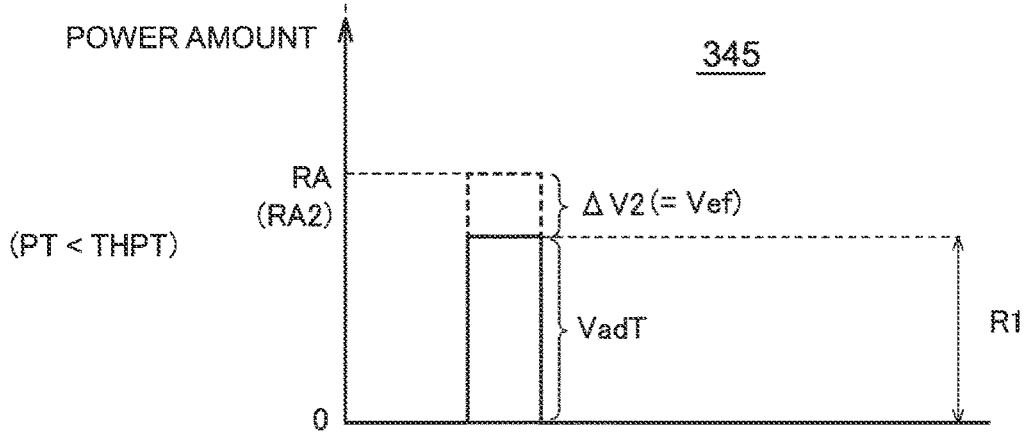

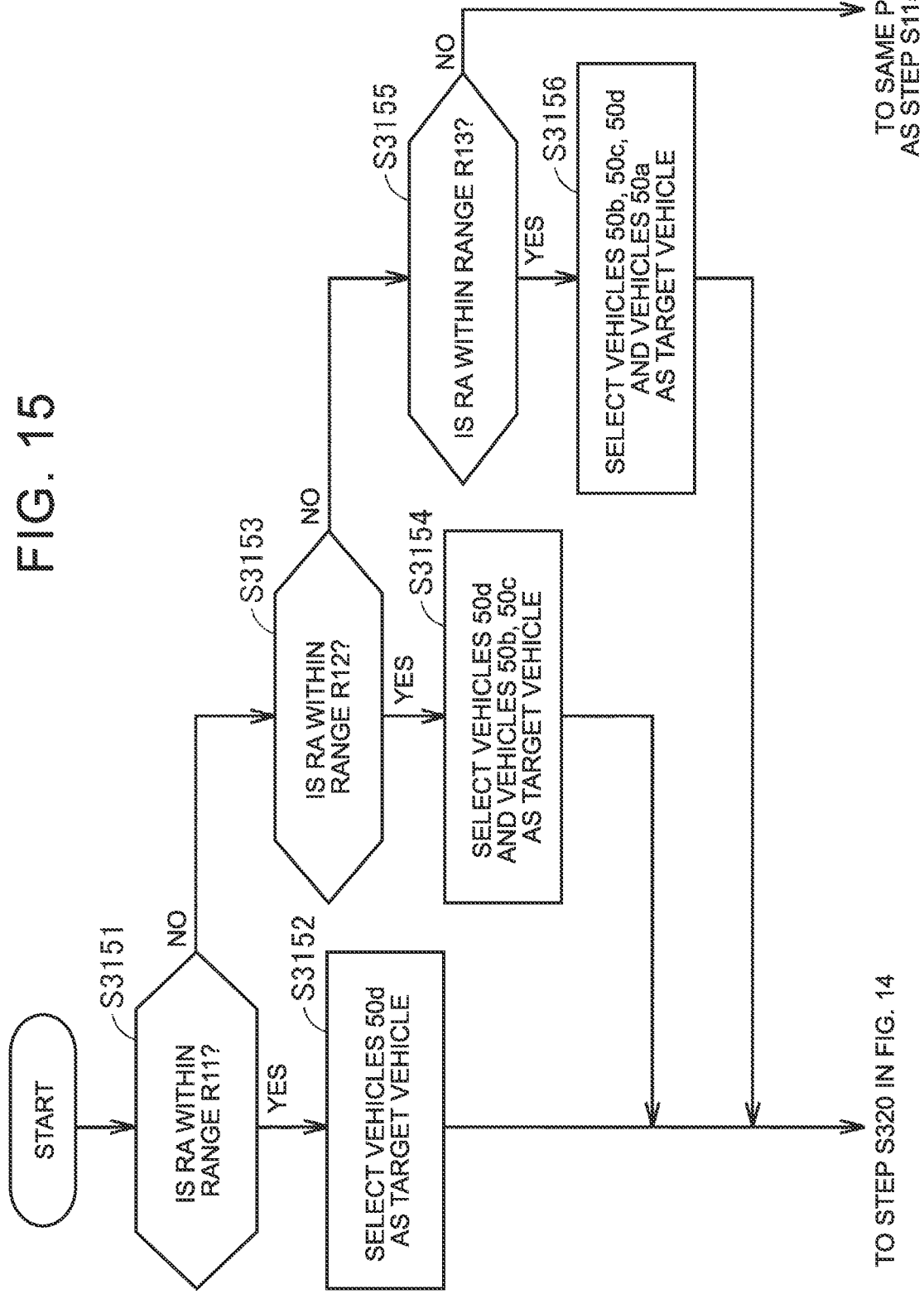

SERVER AND POWER MANAGEMENT SYSTEM

CROSS-REFERENCE TO RELATED APPLICATION

This application claims priority to Japanese Patent Application No. 2022-015691 filed on Feb. 3, 2022, incorporated herein by reference in its entirety.

BACKGROUND

1. Technical Field

The present disclosure relates to a server and a power management system.

2. Description of Related Art

Japanese Unexamined Patent Application Publication No. 2015-95983 (JP 2015-95983 A) discloses a battery electric vehicle. The battery electric vehicle is configured to be able to transmit power to power equipment connected to a commercial power source through a power cable for the power equipment (contact power transmission). The battery electric vehicle is also configured to be able to transmit power to the power equipment in a non-contact manner (non-contact power transmission).

SUMMARY

In a virtual power plant (VPP), a server of an aggregator uses a demand response (DR) in order to adjust the power demand-supply balance. The DR is a scheme for requesting a power resource of a consumer to vary (e.g. increase) a power demand. The DR is performed when a DR signal that requests participation in the DR is transmitted to a target power resource.

A vehicle on which a power storage device is mounted is occasionally used as the power resource. In this case, the server of the aggregator occasionally selects a target vehicle, to which a DR signal is to be transmitted, from among a plurality of vehicles that can each participate in the DR. It is assumed that a certain vehicle, among the vehicles, can participate in the DR by executing contact power transmission, another vehicle can participate in the DR by executing non-contact power transmission while being stationary, and still another vehicle can participate in the DR by executing non-contact power transmission while traveling. It is not discussed in JP 2015-95983 A what is a preferable manner to select a target vehicle from the viewpoint of effective use of power and adjustment of the power demand-supply balance under such a situation.

The present disclosure provides a server and a power management system that allow appropriately selecting a target vehicle from the viewpoint of effective use of power and adjustment of the power demand-supply balance.

The present disclosure provides a server of an aggregator to manage a plurality of vehicles each configured to be able to participate in a demand response (DR) for adjusting a power demand-supply balance in a power system. The server includes a communication device and a processing device. The communication device is configured to be able to transmit a DR signal that requests participation in the DR to each of the vehicles. The processing device selects a target vehicle, to which the DR signal is to be transmitted by the communication device, from among the vehicles in accordance with a priority degree for participation in the DR. A first vehicle among the vehicles is configured to be able to participate in the DR by executing first power transmission to transmit power with a power stand that is external to the first vehicle through a power cable for the power stand. A second vehicle among the vehicles is configured to be able to participate in the DR by executing second power transmission to transmit power in a non-contact manner with power equipment that is external to the second vehicle while the second vehicle is stationary. A third vehicle among the vehicles is configured to be able to participate in the DR by executing third power transmission to transmit power in a non-contact manner with power equipment that is external to the third vehicle while the third vehicle is traveling. The processing device sets the priority degree of the first vehicle to be higher than the priority degree of the second vehicle, and sets the priority degree of the second vehicle to be higher than the priority degree of the third vehicle.

A power loss caused during power transmission is increased in the order of the first power transmission, the second power transmission, and the third power transmission. With the above configuration, the DR signal is preferentially transmitted to the first vehicle over the second vehicle and the third vehicle, and preferentially transmitted to the second vehicle over the third vehicle. This makes it easier for the first vehicle to participate in a DR than for the second vehicle and the third vehicle, and makes it easier for the second vehicle to participate in a DR than for the third vehicle. As a result, a power loss caused when a DR is performed can be reduced compared to the case where the priority degree is not set as described above. Thus, it is possible to adjust the power demand-supply balance while effectively using power.

The processing device may set the priority degree of the first vehicle, the second vehicle, and the third vehicle such that only the first vehicle and the second vehicle, among the first vehicle, the second vehicle, and the third vehicle, are selected as the target vehicle when a penalty to be imposed on an aggregator is less than a threshold.

When the penalty is less than the threshold, the power demand-supply balance is occasionally substantially kept even if the aggregator receives the penalty. With the above configuration, the DR signal may be transmitted to only the first vehicle and the second vehicle when the penalty is less than the threshold. Consequently, a situation in which the third vehicle with a large power loss compared to the first vehicle and the second vehicle participates in a DR is avoided. As a result, it is possible to facilitate adjustment of the power demand-supply balance while effectively using power.

The processing device may set the priority degree of the first vehicle, the second vehicle, and the third vehicle such that only the first vehicle, among the first vehicle, the second vehicle, and the third vehicle, is selected as the target vehicle when a penalty to be imposed on an aggregator is less than a threshold.

When the penalty is less than the threshold, the power demand-supply balance is occasionally substantially kept even if the aggregator receives the penalty. With the above configuration, the DR signal is transmitted to only the first vehicle when the penalty is less than the threshold. Consequently, a situation in which the second vehicle and the third vehicle with a large power loss compared to the first vehicle participate in a DR is avoided. As a result, it is possible to facilitate adjustment of the power demand-supply balance while effectively using power.

The processing device may set the priority degree of the first vehicle to be high when the first vehicle is not able to execute the second power transmission or the third power transmission compared to when the first vehicle is able to further execute at least one of the second power transmission and the third power transmission.

The first vehicle has more choices for power transmission for participation in a DR when the first vehicle can further execute at least one of the second power transmission and the third power transmission than when the first vehicle cannot execute the second power transmission or the third power transmission. With the above configuration, the first vehicle tends to be selected as a target vehicle when the first vehicle has fewer choices for power transmission than when the first vehicle has a relatively large number of choices. Consequently, the processing device can select a target vehicle from among the first vehicles that have more choices for power transmission, even when the prediction result of the power demand-supply balance is varied abruptly after the DR signal is transmitted to the first vehicles that have fewer choices for power transmission. As a result, it is possible to flexibly handle abrupt variations in the prediction result of the power demand-supply balance.

The penalty may be an amount of power by which an amount of power transmitted from the first vehicle and the second vehicle to the power system during a predetermined period in which a DR is performed is short with respect to an adjustment request power amount that is necessary to adjust a demand-supply balance in the power system during the predetermined period in which the DR is performed.

When the penalty is less than the threshold, the power demand-supply balance is occasionally substantially kept even if the aggregator receives the penalty. With the above configuration, the DR signal may be transmitted to only the first vehicle and the second vehicle when the penalty is less than the threshold. Consequently, a situation in which the third vehicle with a large power loss compared to the first vehicle and the second vehicle participates in a DR is avoided. As a result, it is possible to facilitate adjustment of the power demand-supply balance while effectively using power.

The penalty may be an amount of power by which an amount of power transmitted from the first vehicle to the power system during a predetermined period in which a DR is performed is short with respect to an adjustment request power amount that is necessary to adjust a demand-supply balance in the power system during the predetermined period in which the DR is performed.

The first vehicle has more choices for power transmission for participation in a DR when the first vehicle can further execute at least one of the second power transmission and the third power transmission than when the first vehicle cannot execute the second power transmission or the third power transmission. With the above configuration, the first vehicle tends to be selected as a target vehicle when the first vehicle has fewer choices for power transmission than when the first vehicle has a relatively large number of choices. Consequently, the processing device can select a target vehicle from among the first vehicles that have more choices for power transmission, even when the prediction result of the power demand-supply balance is varied abruptly after the DR signal is transmitted to the first vehicles that have fewer choices for power transmission. As a result, it is possible to flexibly handle abrupt variations in the prediction result of the power demand-supply balance.

The processing device may set the priority degree of the first vehicle to be high when the first vehicle is able to further execute one of the second power transmission and the third power transmission compared to when the first vehicle is able to further execute both the second power transmission and the third power transmission.

The first vehicle has still more choices for power transmission for participation in a DR when the first vehicle can further execute both the second power transmission and the third power transmission than when the first vehicle can further execute one of the second power transmission and the third power transmission. With the above configuration, the first vehicle tends to be selected as a target vehicle when the first vehicle has fewer choices for power transmission than when the first vehicle has still more choices. Consequently, the processing device can select a target vehicle from among the first vehicles that have still more choices for power transmission, even when the prediction result of the power demand-supply balance is varied abruptly after the DR signal is transmitted to the first vehicles which have a relatively small number of choices for power transmission. As a result, it is possible to further flexibly handle abrupt variations in the prediction result of the power demand-supply balance.

The present disclosure provides a power management system including a plurality of vehicles and a server. The vehicles are each configured to be able to participate in a demand response (DR) for adjusting a power demand-supply balance in a power system. The server manages the vehicles. The server includes a communication device and a processing device. The communication device is configured to be able to transmit a DR signal that requests participation in the DR to each of the vehicles. A first vehicle among the vehicles is configured to be able to execute first power transmission to transmit power with a power stand that is external to the first vehicle through a power cable for the power stand. A second vehicle among the vehicles is configured to be able to execute second power transmission to transmit power in a non-contact manner with power equipment that is external to the second vehicle while the second vehicle is stationary. A third vehicle among the vehicles is configured to be able to execute third power transmission to transmit power in a non-contact manner with power equipment that is external to the third vehicle while the third vehicle is traveling. The processing device selects a target vehicle, to which the DR signal is to be transmitted by the communication device, from among the vehicles in accordance with a priority degree for participation in the DR. The processing device sets the priority degree of the first vehicle to be higher than the priority degree of the second vehicle, and sets the priority degree of the second vehicle to be higher than the priority degree of the third vehicle.

With the present disclosure, it is possible to appropriately select a target vehicle from the viewpoint of effective use of power and adjustment of the power demand-supply balance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 11 indicates how a server according to a first modification selects a target vehicle from among a vehicle group upon receiving an adjustment request;

FIG. 15 is a flowchart according to the second modification, illustrating the details of a process (step S315 in FIG. 14) of selecting a target vehicle in accordance with the priority degree.

DETAILED DESCRIPTION OF EMBODIMENTS

Figure 1:
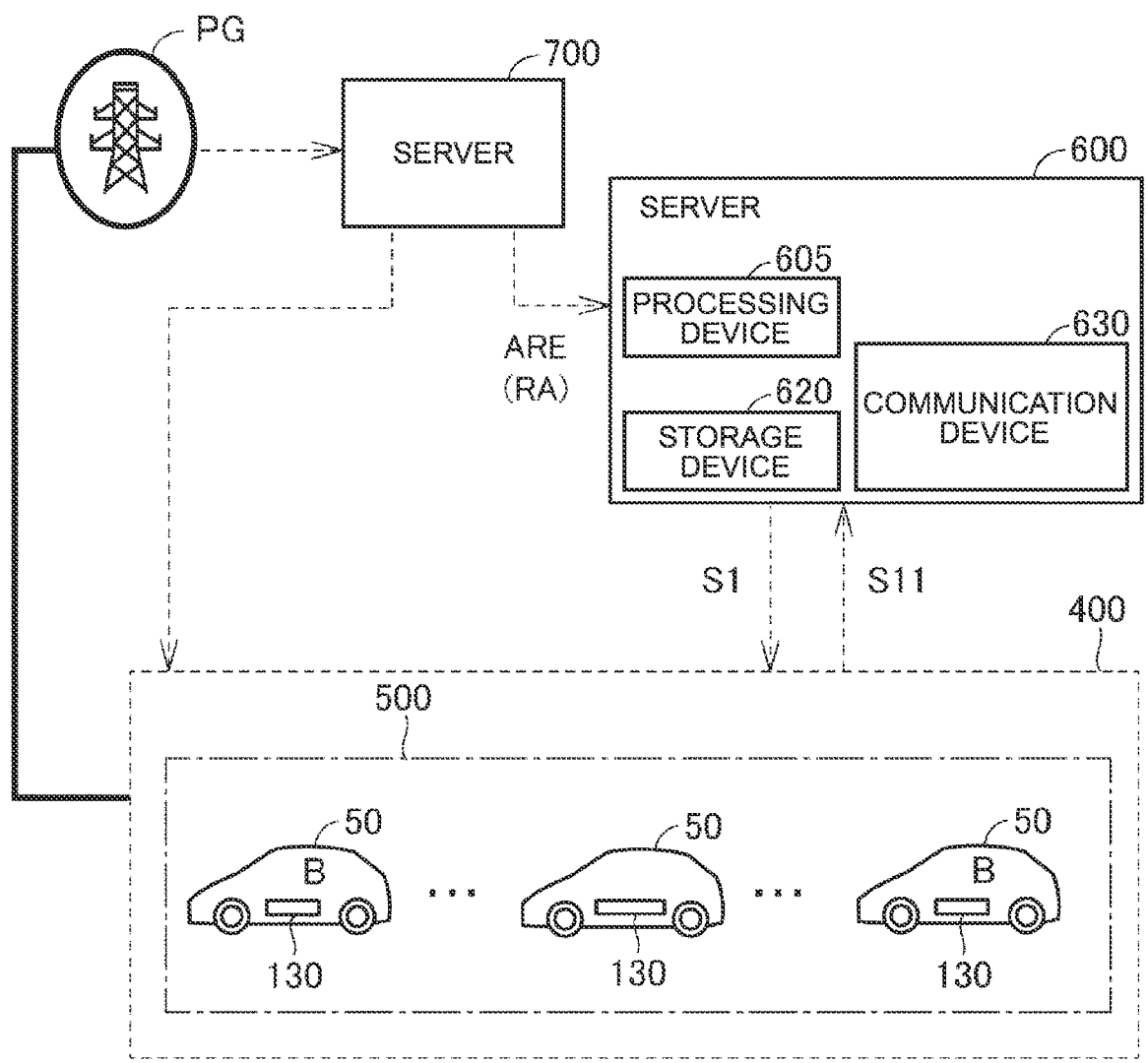
FIG. 1 illustrates a schematic configuration of a power management system according to an embodiment.

An embodiment of the present disclosure will be described in detail below with reference to the drawings. In the drawings, like or corresponding portions are given like signs to omit repeated description thereof.

Embodiment

FIG. 1 illustrates a schematic configuration of a power management system according to an embodiment. With reference to FIG. 1, a power management system 10 includes a power system PG, a power resource group 400, a server 600, and a server 700.

The power system PG is constructed by power transmission/distribution equipment. The power system PG is maintained and managed by a power company that operates the power system PG.

The power resource group 400 includes a vehicle group 500. The vehicle group 500 includes a plurality of vehicles 50, on each of which a battery 130 is mounted. The vehicles 50 are battery electric vehicles (BEVs) configured to be electrically connectable to the power system PG and function as distributed power sources. The power resource group 400 may include other power systems such as a Home Energy Management System (HEMS). A user (owner) of each power resource of the power resource group 400 has made an advance contract with an aggregator (to be discussed later) to be able to participate in a DR when the power resource is requested by the aggregator to participate in the DR.

Each vehicle 50 is configured to be able to execute power transmission with power equipment provided outside the vehicle. The power transmission is executed through external charge in which the vehicle 50 charges the battery 130 using power from the power equipment, for example. In the above power transmission, the vehicle 50 may transmit (supply) power stored in the battery 130 to the power equipment.

When each vehicle 50 executes external charge, power is supplied from the power system PG to the vehicle 50, which increases a power load on the power system PG. Therefore, each vehicle 50 can participate in adjustment (DR) of a power load on the power system PG by executing external charge.

When the vehicle 50 participates in an "increase DR" in which the vehicle 50 is requested to increase the amount of power to be charged through external charge, it is possible to increase the power demand in the power system PG by the increased amount of power. The increase DR is performed when the power supply in the power system PG is greater than the power demand.

When the vehicle 50 participates in a "decrease DR" in which the vehicle 50 is requested to reduce (save) the amount of power to be charged through external charge, on the other hand, the power demand in the power system PG is reduced by the reduced amount of charge power. The decrease DR is performed when the power demand in the power system PG is greater than the power supply.

The server 700 is a computer that belongs to the power company, and is configured to be able to communicate with the server 600 (to be discussed later) of the aggregator. The server 700 predicts the power demand-supply balance in the power system PG for each period (time zone), and outputs an adjustment request ARE for the power demand-supply balance to the server 600 in accordance with the prediction result. The adjustment request ARE includes the prediction result as to which of the power demand and the power supply is the larger in a target period and the amount (adjustment request power amount RA) of power requested to adjust the power load on the power system PG during the period.

When the power demand is greater than the power supply, the adjustment request power amount RA is the amount of power required to be procured by (supplied to) the power system PG or the amount of power required to be reduced in the power system PG. When the power supply is greater than the power demand, on the other hand, the adjustment request power amount RA is the amount of power required to be consumed in the power system PG in order to increase the power load.

The server 600 belongs to the aggregator, and is configured to manage the power resource group 400. The aggregator is a power business operator that procures power for the power system PG using the power resource group 400 and that increases or reduces the power load on the power system PG. The aggregator can obtain a reward from the power company when the aggregator successfully adjusts the power load on the power system PG. On the other hand, the aggregator may receive a penalty from the power company when the aggregator fails to adjust the power load on the power system PG (e.g. fails to procure, increase, or decrease the adjustment request power amount RA).

The server 600 includes a processing device 605, a storage device 620, and a communication device 630. The processing device 605 includes a processor such as a central processing unit (CPU) and a memory such as a read only memory (ROM) and a random access memory (RAM). The storage device 620 stores a program to be executed by the processing device 605 and a variety of information and data to be used by the processing device 605, for example. The communication device 630 is a communication interface of various types, and is configured to be able to transmit a DR signal (to be discussed later) to each of the vehicles 50 of the vehicle group 500.

The server 600 transmits a DR signal S1 to the vehicle 50 that the aggregator requests to participate in a DR, among the vehicle group 500, when an adjustment request ARE is received from the server 700 (to be discussed later).

The DR signal S1 is a signal for requesting the vehicle 50 to participate in a DR. The DR signal S1 includes the type of a DR (e.g. an increase DR or a decrease DR) and the period (DR period) for which the vehicle 50 is requested to participate in a DR.

The DR signal S1 further includes information that indicates a DR amount that is the amount of power that the aggregator asks each power resource (e.g. vehicle 50) to supply to the power system PG or consume or save in the power system PG. For example, the DR amount is the amount of power that the power equipment transmits to the vehicle 50 when the vehicle 50 participates in a DR by consuming (through external charge etc.) power in the power system PG using the power equipment. On the other hand, the DR amount is the amount of power that the power equipment receives from the vehicle 50 when the vehicle 50 participates in a DR by supplying power to the power system PG through the power equipment.

The server 600 is configured to receive an approval signal S11 from the vehicle 50. The approval signal S11 is transmitted from the vehicle 50 to the server 600 when participation of the vehicle 50 in a DR is approved by the user of the vehicle 50.

When the server 600 receives the approval signal S11, a contract is made between the user of the vehicle 50 and the aggregator. This contract includes information that indicates the DR period, the type of the DR, and the DR amount. Contract information that indicates the content of the contract is included in the approval signal S11, and stored in a storage device of the vehicle 50 and the storage device 620 of the server 600.

Figure 2:
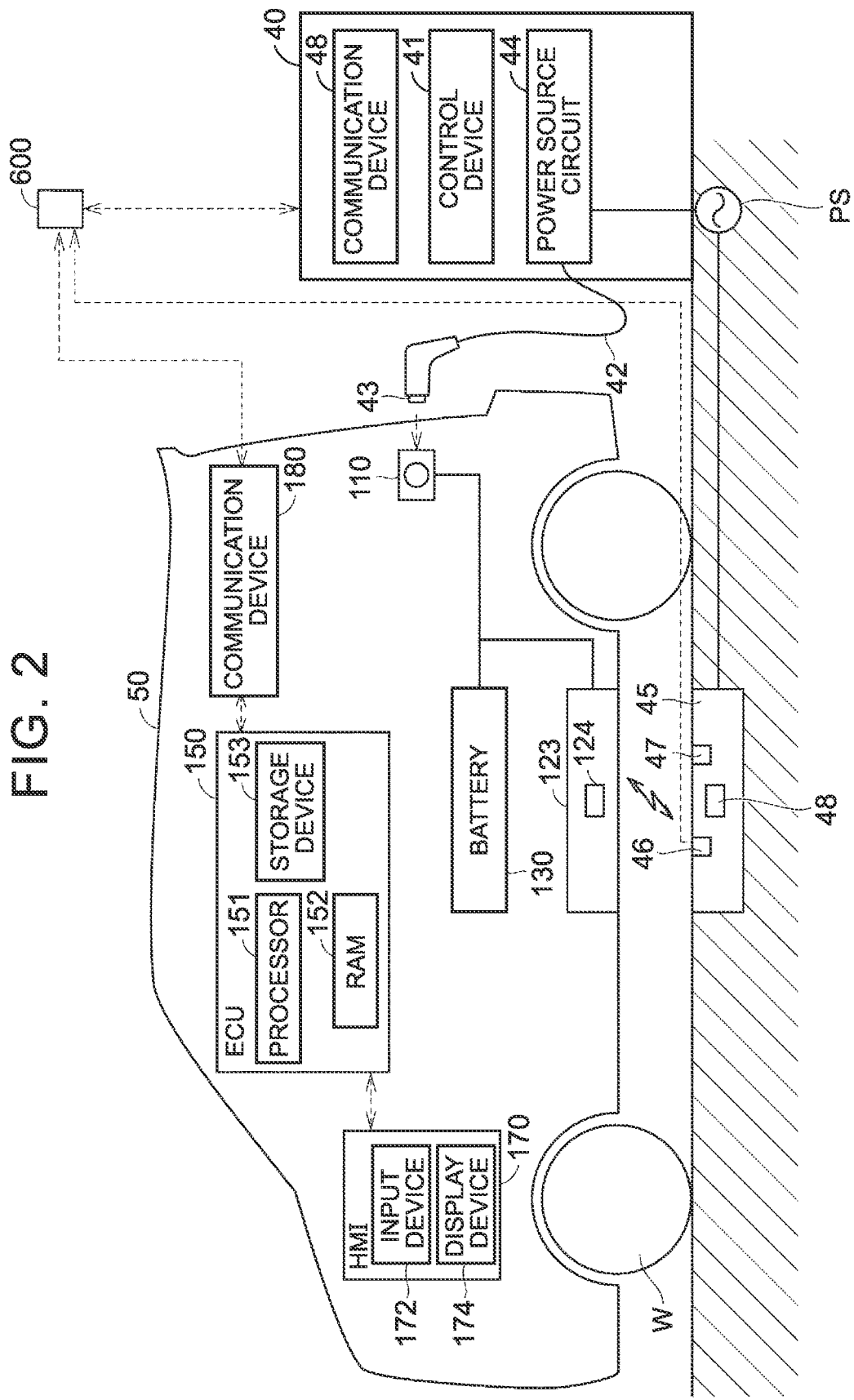
FIG. 2 illustrates the configuration of a vehicle.

FIG. 2 illustrates the configuration of the vehicle 50. With reference to FIG. 2, the vehicle 50 includes an inlet 110, a power transmission/reception device 123, a battery 130, and a human-machine interface (HMI) device 170. The vehicle 50 further includes a communication device 180 and an electronic control unit (ECU) 150.

The inlet 110 is configured to receive power from a power stand 40 (to be discussed later) outside the vehicle 50. The power transmission/reception device 123 includes a coil 124. The power transmission/reception device 123 can receive power in a non-contact manner through the coil 124 from power transmission/reception equipment 45 outside the vehicle 50, and transmit power in a non-contact manner to the power transmission/reception equipment 45 (to be discussed later).

The battery 130 is a secondary battery such as a lithium ion battery or a nickel hydrogen battery, and stores power for travel of the vehicle 50.

The HMI device 170 includes an input device 172 and a display device 174. The input device 172 receives a user operation (e.g. an operation to input the time zone in which the vehicle 50 can participate in a DR, the mode of power transmission that the vehicle 50 can execute during the time zone, and the destination of the vehicle 50). The display device 174 displays various screens.

The communication device 180 is configured to wirelessly communicate with various devices (e.g. the server 600 or a user terminal 300). The communication device 180 receives the DR signal S1 (FIG. 1) from the server 600, and transmits the approval signal S11 to the server 600, for example.

The ECU 150 controls various devices such as the power transmission/reception device 123, the HMI device 170, and the communication device 180. The ECU 150 controls external charge of the vehicle 50 by outputting a charge start request or a charge stop request to the power stand 40 or the power transmission/reception equipment 45, for example. When a destination for the vehicle 50 is set, the ECU 150 can set a travel route for the vehicle 50 in accordance with the present location and the destination.

The power transmission/reception equipment 45 includes a coil 39, a communication device 46, and a control device 47. The coil 39 is connected to a commercial power source PS through an inverter (not illustrated). The coil 39 is configured to supply power to the vehicle 50 in a non-contact manner (more specifically, to the coil 124 through an electromagnetic field) using power supplied from the commercial power source PS, and receive power from the vehicle 50 in a non-contact manner.

The control device 47 controls power transmission between the power transmission/reception equipment 45 and the vehicle 50 during a DR period. The communication device 46 is configured to communicate with the server 600.

The power transmission/reception equipment 45 is installed on the ground (e.g. in a travel lane). The power transmission/reception equipment 45 may be installed on a side wall. When the power transmission/reception equipment 45 is installed in a travel lane, the travel lane is also referred to as a power supply lane.

The power stand 40 includes a power source circuit 44, a power cable 42, a connector 43, a communication device 48, and a control device 41.

The power source circuit 44 converts power supplied from the commercial power source PS, and outputs power after the conversion to the power cable 42.

The power cable 42 supplies power from the power stand 40 to the vehicle 50. The power cable 42 can also supply power from the vehicle 50 to the power stand 40.

The connector 43 is provided at the distal end of the power cable 42, and configured to be insertable into the inlet 110 of the vehicle 50.

The communication device 48 is configured to communicate with an external device such as the server 600. The control device 41 controls the communication device 48 and the power source circuit 44.

The control device 41 is configured to be able to execute a power transmission process, in which power is transmitted from the power stand 40 to the vehicle 50, during a DR period in accordance with a power transmission plan transmitted from the server 600. When the power transmission process is executed, external charge of the vehicle 50 is executed. The control device 41 is also configured to be able to execute a power reception process, in which the power stand 40 receives power from the vehicle 50, during a DR period in accordance with the above power transmission plan. In this case, power is supplied from the battery 130 of the vehicle 50 to the power stand 40.

Contact power transmission (first power transmission) corresponds to power transmission between the vehicle 50 and the power stand 40 through the power cable 42. Non-contact power transmission (second power transmission) performed while the vehicle 50 is stationary corresponds to power transmission between the vehicle 50 and the power transmission/reception equipment 45 performed in a non-contact manner while the vehicle 50 is stationary. Non-contact power transmission (third power transmission) performed while the vehicle 50 is traveling corresponds to power transmission between the vehicle 50 and the power transmission/reception equipment 45 performed in a non-contact manner while the vehicle 50 is traveling.

Figure 3:
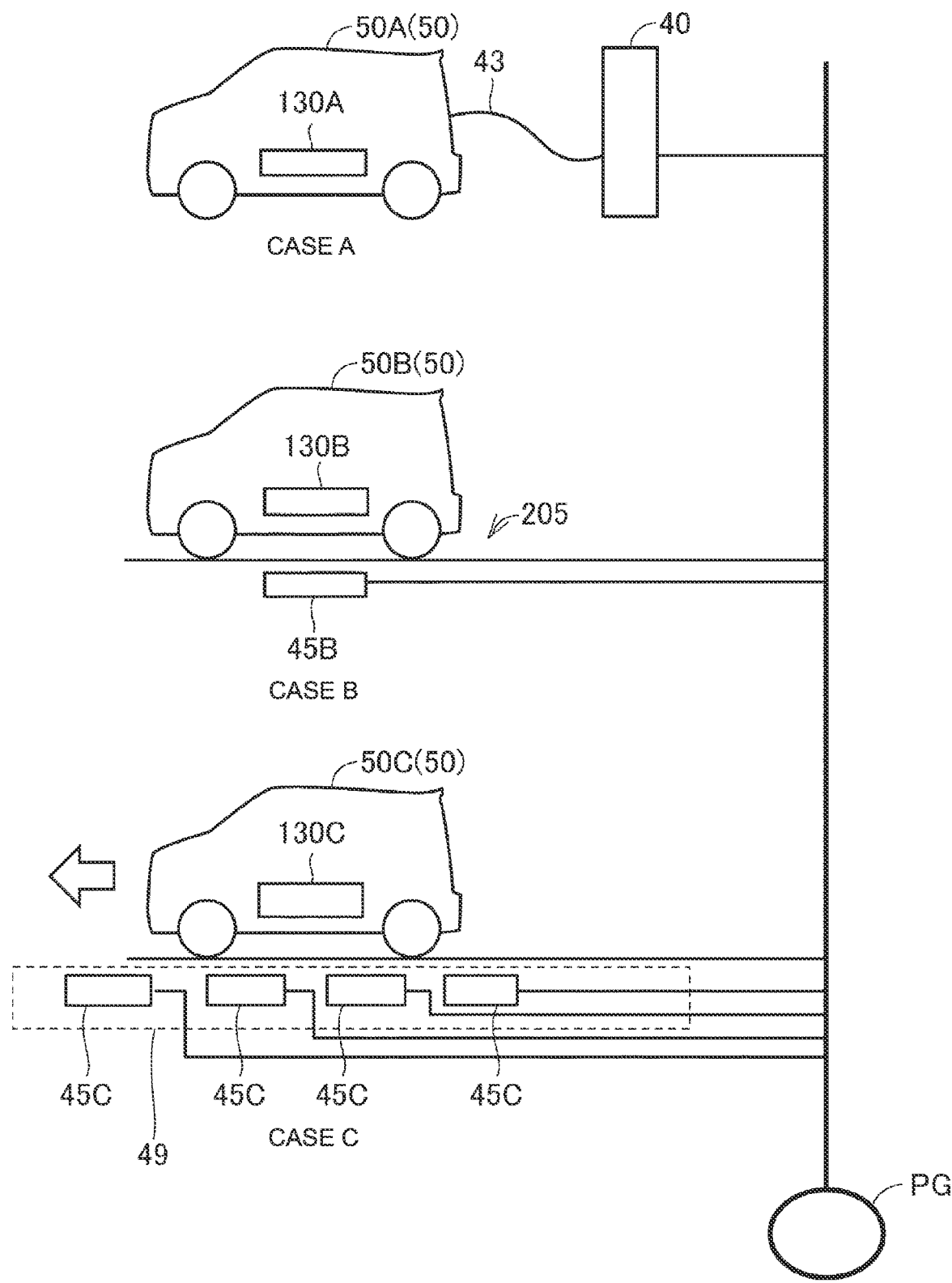
FIG. 3 illustrates situations in which vehicles are executing contact power transmission, non-contact power transmission while being stationary, and non-contact power transmission while traveling.

FIG. 3 illustrates situations in which the vehicles 50 are executing contact power transmission, non-contact power transmission while being stationary, and non-contact power transmission while traveling.

With reference FIG. 3, when the vehicle 50 participates in a DR by executing contact power transmission (e.g. contact charge) using the power stand 40 (case A), the vehicle 50 is also represented as a vehicle 50A. A battery 130A is the battery 130 of the vehicle 50A.

When the vehicle 50 participates in a DR by executing non-contact power transmission (e.g. non-contact charge) using power transmission/reception equipment 45B while the vehicle 50 is stationary (case B), the vehicle 50 is also represented as a vehicle 50B. The power transmission/reception equipment 45B is the power transmission/reception equipment 45 installed in a parking lot 205 in this example. A battery 130B is the battery 130 of the vehicle 50B.

When the vehicle 50 participates in a DR by executing non-contact power transmission (e.g. non-contact charge) using power transmission/reception equipment 45C while the vehicle 50 is traveling (case C), the vehicle 50 is also represented as a vehicle 50C. The power transmission/reception equipment 45C is the power transmission/reception equipment 45 installed in a power supply lane 49. A battery 130C is the battery 130 of the vehicle 50C.

Figures 4, 5:
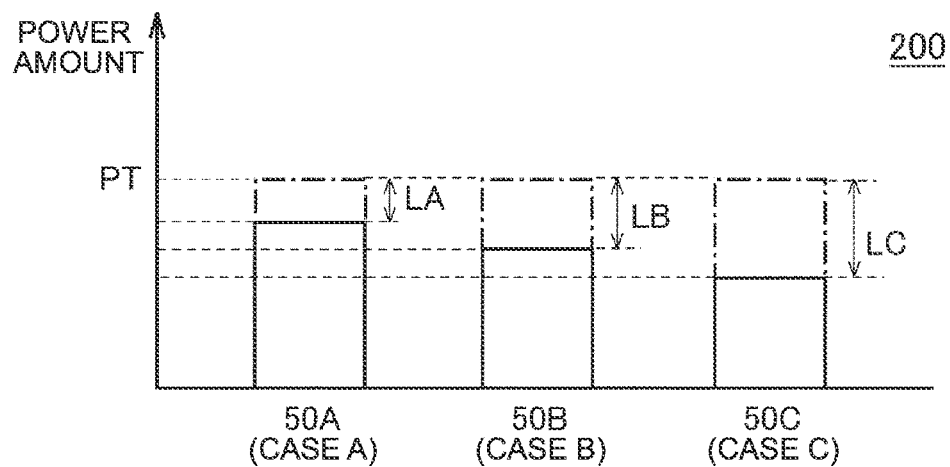
FIG. 4 indicates the difference in the power transmission efficiency among cases A to C.
FIG. 5 indicates an example of management data for power resources stored in a storage device of a server.

FIG. 4 indicates the difference in the power transmission efficiency among the cases A to C. With reference to FIG. 4, it is assumed that the amount of power to be transmitted from the power stand 40 to the vehicle 50A, the amount of power to be transmitted from the power transmission/reception equipment 45B to the vehicle 50B, and the amount of power to be transmitted from the power transmission/reception equipment 45C to the vehicle 50C are all PT in this example.

The power transmission efficiency between the vehicle 50A, 50B, 50C and the power stand 40 and the power transmission/reception equipment 45B, 45C is represented as a power transmission efficiency PTE1, PTE2, PTE3, respectively. In general, the power transmission efficiency is the highest with contact power transmission (case A), the second highest with non-contact power transmission while being stationary (case B), and the lowest with non-contact power transmission while traveling (case C) (PTE1>PTE2>PTE3). Hence, the amount of power generated as a power loss L in the power transmission is the largest in case C, the second largest in case B, and the smallest in case A (LC>LB>LA). An increase in the power loss L for the entirety of the vehicles 50 and power system PG is not preferable from the viewpoint of effective use of power for the power system PG and the vehicles 50.

The processing device 605 of the server 600 according to the present embodiment selects a target vehicle, to which is the DR signal S1 is to be transmitted by the communication device 630, from among the plurality of vehicles 50 in accordance with the priority degree for participation in a DR. Then, the processing device 605 sets the priority degree of the vehicle 50A to be higher than the priority degree of the vehicle 50B, and sets the priority degree of the vehicle 50B to be higher than the priority degree of the vehicle 50C.

With such a configuration, the DR signal S1 is preferentially transmitted to the vehicle 50A over the vehicle 50B and the vehicle 50C, and preferentially transmitted to the vehicle 50B over the vehicle 50C. This makes it easier for the vehicle 50A to participate in a DR than for the vehicle 50B and the vehicle 50C, and makes it easier for the vehicle 50B to participate in a DR than for the vehicle 50C. As a result, it is possible to reduce the power loss caused for the entirety of the power system PG and the vehicles 50 when a DR is performed compared to the case where the priority degree is not set as described above. Thus, it is possible to adjust the power demand-supply balance while effectively using power of the power system PG and the vehicles 50 (while reducing the power loss L for the entirety of the power system PG and the vehicles 50).

FIG. 5 indicates an example of management data for power resources stored in the storage device 620 of the server 600. With reference to FIG. 5, management data 670 includes identification (ID) information 671, DR participation mode information 672, DR amount information 673, and priority degree information 675.

The ID information 671 indicates an ID for identifying power resources. In this example, power resources with IDs of RS1 to RS8 are each a vehicle 50.

The DR participation mode information 672 indicates, for each DR period and ID, through what mode of power transmission (e.g. external charge) the power resources can participate in a DR when the power resources are requested to participate in a DR. The DR participation mode information 672 is determined in accordance with the content of the contract made in advance between the aggregator and the users of the power resources. In this example, the vehicles 50 are requested to participate in a DR during a period P1 that is an example of a DR period. The DR participation mode information 672 may be different among the areas managed by the aggregator.

The vehicle 50 with an ID of RS1 can participate in a DR through any of contact charge, non-contact charge while being stationary, and non-contact charge while traveling during the period P1. The vehicle 50 with an ID of RS2 can participate in a DR through either of contact charge and non-contact charge while being stationary, but cannot participate in a DR through non-contact charge while traveling, during the period P1.

The DR amount information 673 represents a DR amount dra of each power resource. In this example, it is assumed that the DR amount dra is equal (a=b=c=d=e=f=g=h), for simplicity of description.

The priority degree information 675 indicates a priority degree p to be allocated to each power resource. The vehicle 50 with a higher priority degree p is more likely to be selected as a target vehicle. The priority degree p is set by the server 600 in accordance with the DR participation mode information 672. This respect will be described below.

The vehicles 50 with IDs of RS1 to RS4 can participate in a DR through contact charge during the period P1. The vehicles 50 with IDs of RS5 to RS8 cannot participate in a DR through contact charge during the period P1. The priority degree p of the vehicles 50 with IDs of RS1 to RS4 is set to be higher than the priority degree p of the vehicles 50 with IDs of RS5 to RS8 (pa, pb, pc, pd>pe, pf, pg, ph).

The vehicles 50 with IDs of RS5 and RS6 can participate in a DR through non-contact charge while being stationary during the period P1. The vehicles 50 with IDs of RS7 and RS8 cannot participate in a DR through non-contact charge while being stationary during the period P1. The priority degree p of the vehicles 50 with IDs of RS5 and RS6 is set to be higher than the priority degree p of the vehicles 50 with IDs of RS7 and RS8 (pe, pf>pg, ph).

The vehicle 50 with an ID of RS7 can participate in a DR through only non-contact charge while traveling during the period P1. The vehicle 50 with an ID of RS8 cannot participate in a DR during the period P1. The priority degree p of the vehicle 50 with an ID of RS7 is set to be higher than the priority degree p of the vehicle 50 with an ID of RS8 (pg>ph).

The management data 670 further include ID information 671, DR participation mode information 672, DR amount information 673, and priority degree information 675 about vehicles 50 with IDs that are different from RS1 to RS8. The DR participation mode information 672 on such vehicles 50 is classified into any of the DR participation mode information 672 of the vehicles 50 with IDs of RS1 to RS8. Specifically, the pattern of the DR participation mode information 672 on the vehicles 50 is classified into any of the eight patterns of the DR participation mode information 672 indicated in the drawing in accordance with which of contact charge, non-contact charge while being stationary, and non-contact charge while traveling the vehicles 50 can participate in a DR through during the period P1.

Hereinafter, vehicles 50 with the same DR participation mode information 672 as the DR participation mode information 672 of the vehicles 50 with IDs of RS1 to RS8 will also be represented as vehicles 50*a* to 50*h*. It is assumed that the DR amount dra is equal also for the vehicles 50*a* to 50*h*.

Figure 6:
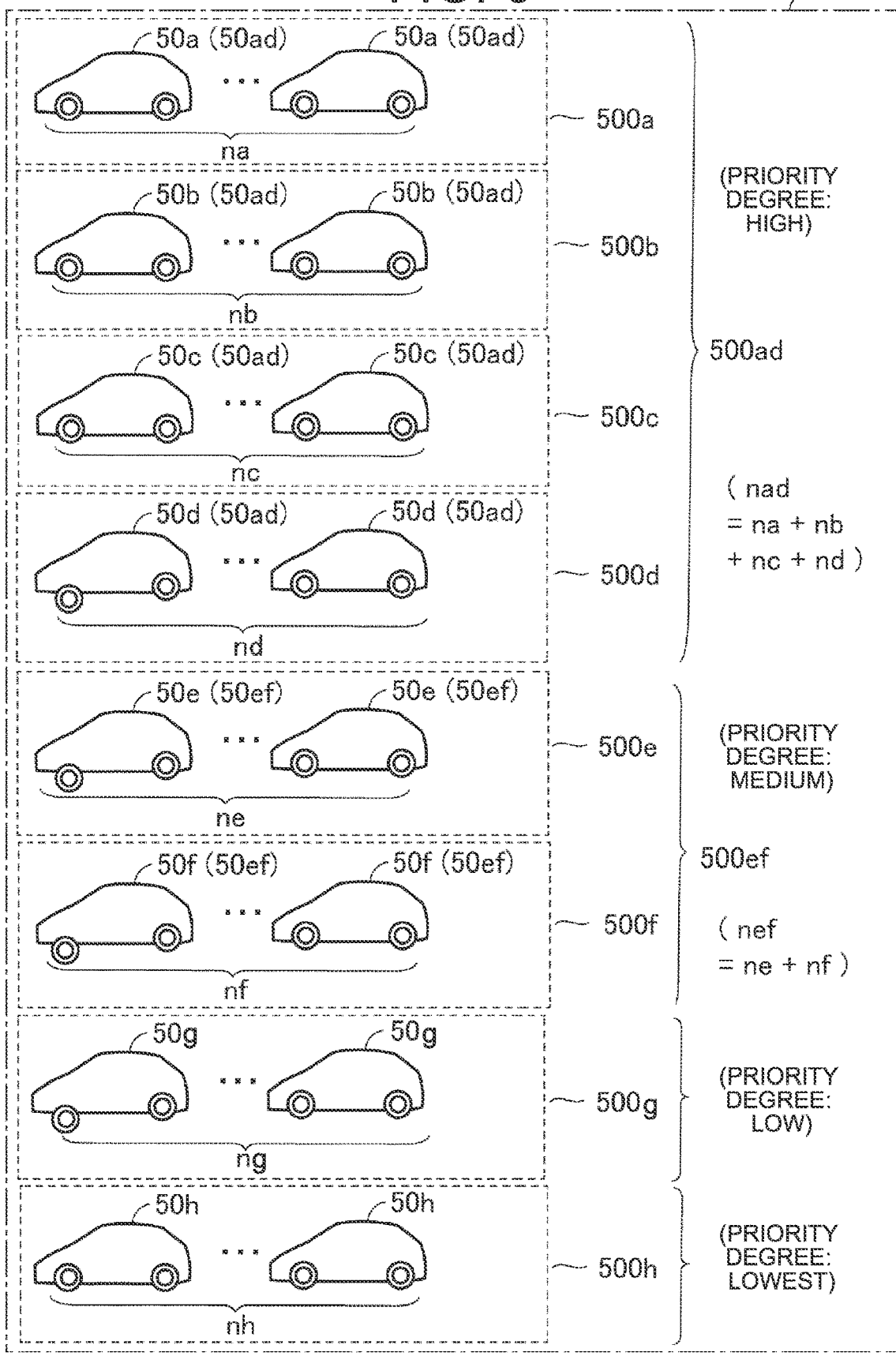
FIG. 6 illustrates how the server classifies vehicles in accordance with DR participation mode information.

FIG. 6 illustrates how the server 600 classifies the vehicles 50 in accordance with the DR participation mode information 672. With reference to FIG. 6, the vehicles 50 of the vehicle group 500 are classified into any of eight groups 500*a* to 500*h* in accordance with the DR participation mode information 672 (FIG. 5).

The groups 500*a* to 500*h* are groups formed from the vehicles 50*a* to 50*h*, respectively. In this example, the groups 500*a* to 500*h* are formed from na to nh vehicles 50, respectively.

The group 500*ad* is formed from the groups 500*a* to 500*d*. In other words, the group 500*ad* is formed from the vehicles 50*a* to 50*d* that can participate in a DR through contact charge during the period P1. The vehicles 50 that belong to the group 500*ad* are also represented as vehicles 50*ad*. The vehicles 50*ad* correspond to the vehicles 50A (FIG. 3), for example.

The group 500*ef* is formed from the groups 500*e*, 500*f*. In other words, the group 500*ef* is formed from the vehicles 50*e*, 50*f* that cannot participate in a DR through contact charge but that can participate in a DR through non-contact charge while being stationary during the period P1. The vehicles 50 that belong to the group 500*ef* are also represented as vehicles 50*ef*. The vehicles 50*ef* correspond to the vehicles 50B, for example.

The group 500*g* is formed from the vehicles 50*g* that cannot participate in a DR through contact charge or non-contact charge while being stationary but that can participate in a DR through non-contact charge while traveling during the period P1. The vehicles 50*g* correspond to the vehicles 50C, for example. The group 500*h* is formed from the vehicles 50*h* that cannot participate in a DR during the period P1.

The server 600 sets the priority degree p of the vehicles 50*ad* to be higher than the priority degree p of the vehicles 50*ef*. The server 600 sets the priority degree p of the vehicles 50*ef* to be lower than the priority degree p of the vehicles 50*ad*, but sets the priority degree p of the vehicles 50*ef* to be higher (in this example, to a medium degree) than the priority degree p of the vehicles 50*g*. The server 600 sets the priority degree p of the vehicles 50*g* to be lower than the priority degree p of the vehicles 50*ef*, but sets the priority degree p of the vehicles 50*g* to be higher than the priority degree p of the vehicles 50*h*. The server 600 sets the priority degree p of the vehicles 50*h* to be the lowest of the priority degree p of the vehicles 50*ad*, 50*ef*, 50*g*, 50*h*. The vehicles 50 (in this example, the vehicles 50*h*), the priority degree of which is set to be the lowest, are excluded from candidates for a target vehicle.

Figure 7:
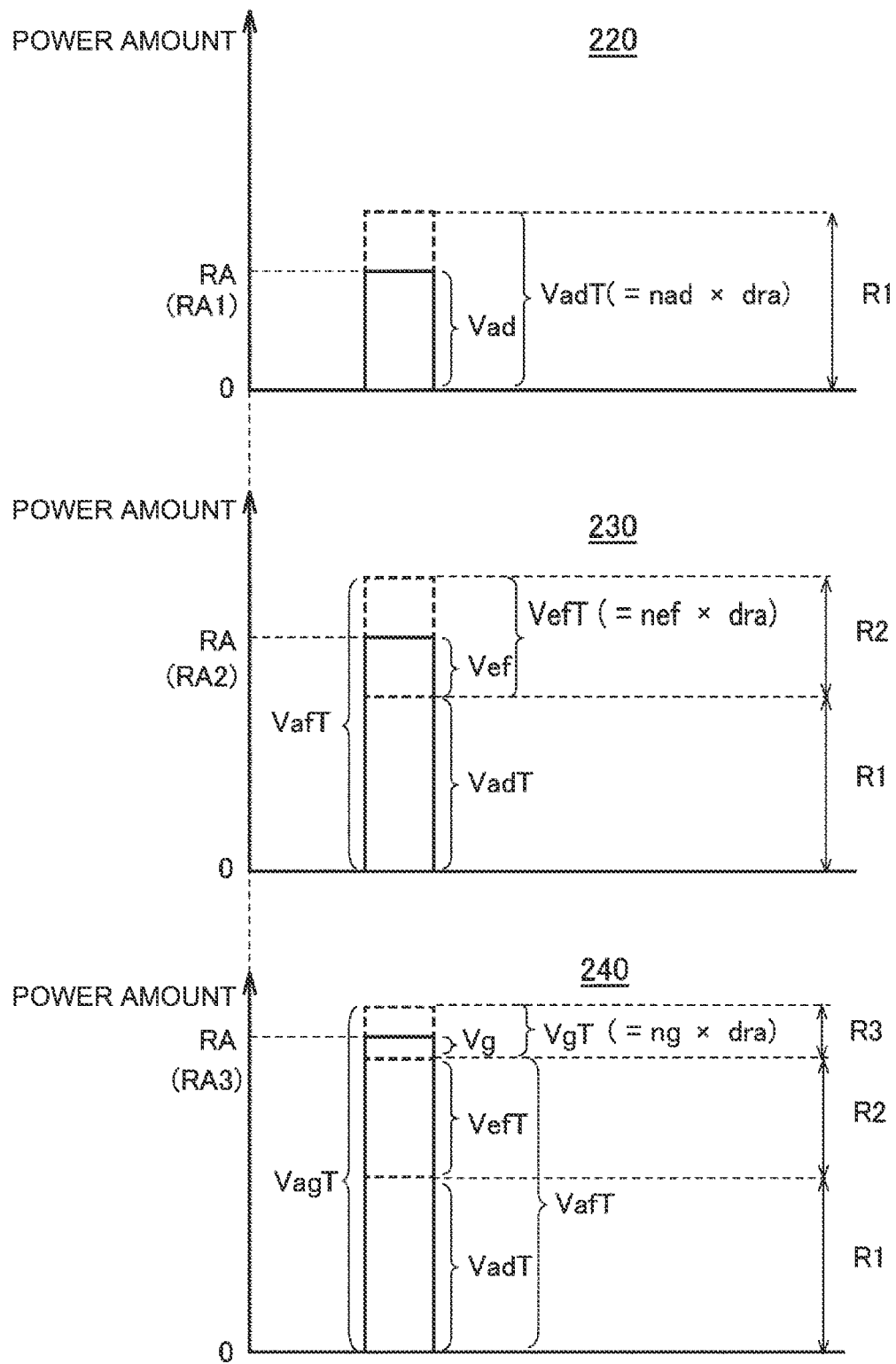
FIG. 7 indicates how the server according to the present embodiment selects a target vehicle from among a vehicle group upon receiving an adjustment request.

FIG. 7 indicates how the server 600 according to the present embodiment selects a target vehicle from among the vehicle group 500 upon receiving the adjustment request ARE. FIG. 6 will be referenced as appropriate in the following description.

In this example, with reference to FIG. 7, the adjustment request power amount RA is the amount of power required to be consumed by the power resource group 400 (e.g. the vehicle group 500) in the power system PG.

A graph 220 illustrates how the server 600 selects a target vehicle when the adjustment request power amount RA during the period P1 is within a range R1 of 0 or more and less than VadT. This case corresponds to the case where the server 600 selects the vehicles 50*ad* (FIG. 6) as a target vehicle, among the vehicles 50*ad*, 50*ef*, 50*g*, in order to adjust the power demand-supply balance. VadT is the maximum amount of power (total of the DR amounts dra of all the vehicles 50*ad*) that can be consumed in the power system PG by the vehicles 50*ad* during the period P1.

When the adjustment request power amount RA is within the range R1, the server 600 selects at least one vehicle 50*ad* as a target vehicle, from among the group 500*ad*, so that the adjustment request power amount RA is consumed in the power system PG during the period P1. In this example, the server 600 executes this selection process so that the total (Vad) of the DR amounts dra of the at least one vehicle 50*ad* reaches the adjustment request power amount RA (=RA1).

A graph 230 illustrates how the server 600 selects a target vehicle when the adjustment request power amount RA during the period P1 is within a range R2 of VadT or more and less than VafT (to be discussed later). This case corresponds to the case where the server 600 selects the vehicles 50*ef* in addition to the vehicles 50*ad* as a target vehicle, among the vehicles 50*ad*, 50*ef*, 50*g*, in order to adjust the power demand-supply balance.

In this example, the adjustment request power amount RA has a value of RA2, which is larger than VadT. VefT is the maximum amount of power (total of the DR amounts dra of all the vehicles 50*ef*) that can be consumed in the power system PG by the vehicles 50*ef* during the period P1. VafT is the total of VadT and VefT.

When the adjustment request power amount RA is within the range R2, the server 600 selects all the vehicles 50*ad* as a target vehicle, and selects at least one vehicle 50*ef* as a target vehicle from among the group 500*ef*, so that the adjustment request power amount RA is consumed in the power system PG during the period P1. The server 600 executes this selection process so that the sum of the total (Vef) of the DR amounts dra of the at least one vehicle 50*ef* and VadT reaches the adjustment request power amount RA (=RA2), for example.

A graph 240 illustrates how the server 600 selects a target vehicle when the adjustment request power amount RA during the period P1 is within a range R3 of VafT or more and less than VagT (to be discussed later). This case corresponds to the case where the server 600 selects the vehicles 50g in addition to the vehicles 50ad, 50ef as a target vehicle, among the vehicles 50ad, 50ef, 50g, in order to adjust the power demand-supply balance.

In this example, the adjustment request power amount RA has a value of RA3, which is larger than VafT. VgT is the maximum amount of power (total of the DR amounts dra of all the vehicles 50g) that can be consumed in the power system PG by the vehicles 50g during the period P1. VagT is the total of VafT and VgT.

When the adjustment request power amount RA is within the range R3, the server 600 selects all the vehicles 50ad, 50ef as a target vehicle, and selects at least one vehicle 50g as a target vehicle from among the group 500g, so that the adjustment request power amount RA is consumed in the power system PG during the period P1. The server 600 executes this selection process so that the sum of the total (Vg) of the DR amounts dra of the at least one vehicle 50g and VafT reaches the adjustment request power amount RA (=RA3), for example.

Figure 8:
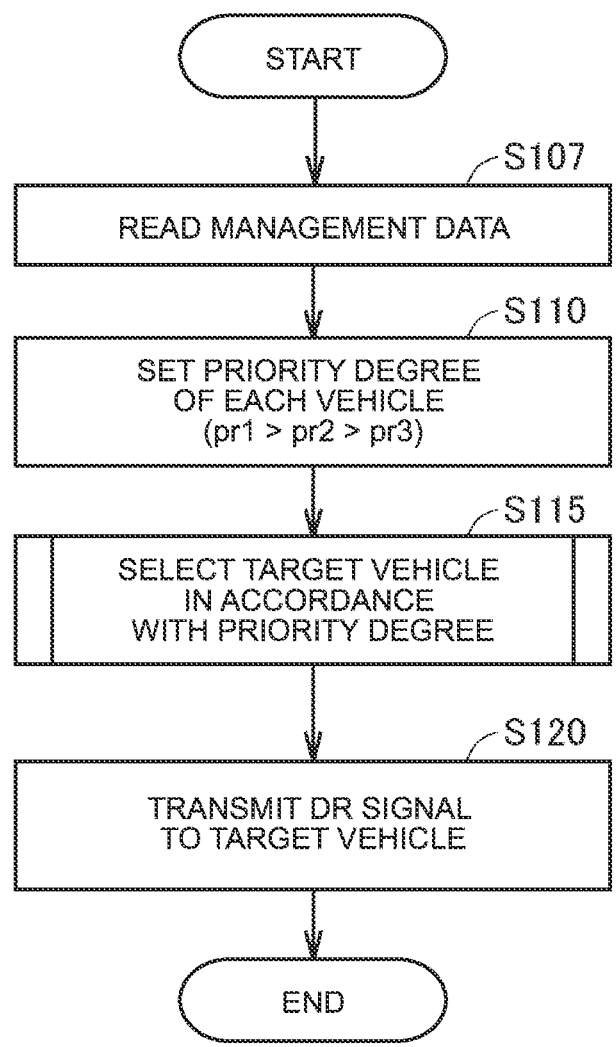
FIG. 8 is a flowchart illustrating an example of a process to be executed by the server according to the present embodiment.

FIG. 8 is a flowchart illustrating an example of a process to be executed by the server 600 according to the present embodiment. This flowchart is started when the server 600 receives the adjustment request ARE (FIG. 1). FIGS. 5 to 7 will be referenced as appropriate in the following description.

With reference to FIG. 8, the server 600 (more particularly, the processing device 605) reads management data 670 (step S107).

Then, the server 600 sets a priority degree p (in other words, priority degree information 675) of each vehicle 50 in accordance with the ID information 671 and the DR participation mode information 672 of the management data 670 (step S110).

In this example, the server 600 sets the priority degree p (=pr1) of the vehicles 50ad to be higher than the priority degree p (=pr2) of the vehicles 50ef. Further, the server 600 sets the priority degree p of the vehicles 50ef to be higher than the priority degree p (=pr3) of the vehicles 50g (pr1>pr2>pr3). In this example, pr1=pa=pb=pc=pd (FIG. 5) is met. pr2=pe=pf is met. pr3=pg is met.

Then, the server 600 selects a target vehicle in accordance with the priority degree p of each vehicle 50 that has been set (step S115). This process will be described in detail with reference to FIG. 9.

Then, the server 600 transmits a DR signal S1 (FIG. 1) to the target vehicle (step S120).

Figure 9:
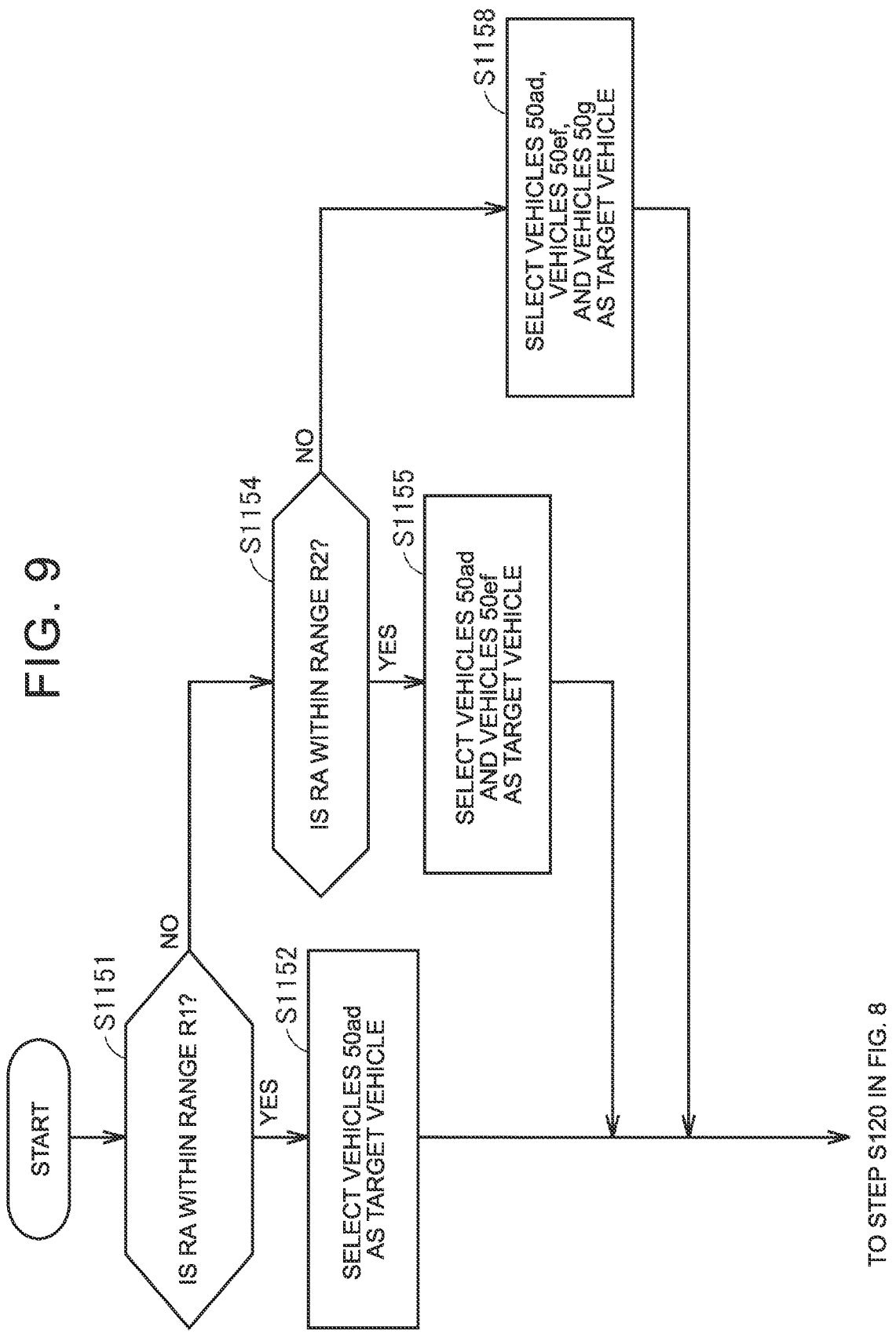
FIG. 9 is a flowchart illustrating the details of a process (step S115 in FIG. 8) of selecting a target vehicle in accordance with the priority degree in the present embodiment.

FIG. 9 is a flowchart illustrating the details of a process (step S115 in FIG. 8) of selecting a target vehicle in accordance with the priority degree p in the present embodiment.

With reference to FIG. 9, the processing device 605 of the server 600 determines whether the adjustment request power amount RA is within the range R1 (step S1151).

When the adjustment request power amount RA is within the range R1 (YES in step S1151), the processing device 605 selects the vehicles 50ad as a target vehicle from among the vehicle group 500 in accordance with the priority degree p (pr1>pr2>pr3) of each vehicle 50 (step S1152). That is, the processing device 605 preferentially selects the vehicles 50ad with the highest priority degree p as a target vehicle from among the vehicles 50ad, 50ef, 50g (graph 220 in FIG. 7). After step S1152, the process proceeds to step S120 in FIG. 8.

When the adjustment request power amount RA is outside the range R1 (NO in S1151), on the other hand, the processing device 605 proceeds to step S1154.

Then, the processing device 605 determines whether the adjustment request power amount RA is within the range R2 (step S1154).

When the adjustment request power amount RA is within the range R2 (YES in step S1154), the processing device 605 selects the vehicles 50ad and the vehicles 50ef as a target vehicle from among the vehicle group 500 in accordance with the priority degree p of each vehicle 50 (step S1155). More particularly, the processing device 605 preferentially selects the vehicles 50ad as a target vehicle over the vehicles 50ef, among the vehicles 50ad, 50ef (graph 230 in FIG. 7). After that, the process proceeds to step S120 in FIG. 8.

When the adjustment request power amount RA is outside the range R2 (NO in step S1154), on the other hand, it is assumed that the adjustment request power amount RA is within the range R3 in this example. In this case, the processing device 605 proceeds to step S1158.

Then, the processing device 605 selects the vehicles 50ad, the vehicles 50ef, and the vehicles 50g as a target vehicle from among the vehicle group 500 in accordance with the priority degree p of each vehicle 50 (step S1158). More particularly, the processing device 605 preferentially selects the vehicles 50ad, 50ef as a target vehicle over the vehicles 50g, among the vehicles 50ad, 50ef, 50g (graph 240 in FIG. 7). After that, the process proceeds to step S120 in FIG. 8.

Figure 10:
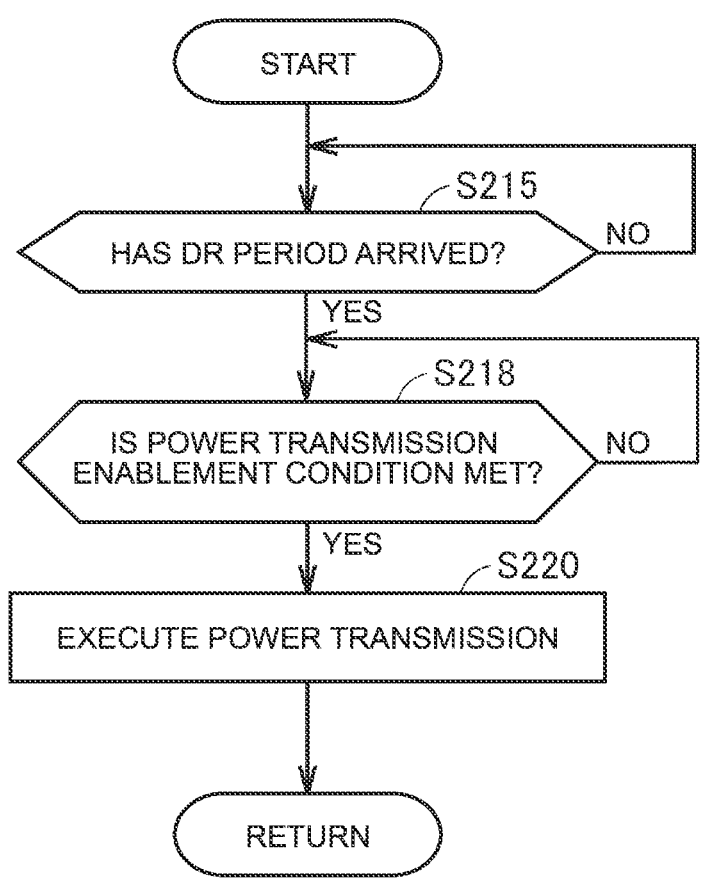
FIG. 10 is a flowchart illustrating an example of a process to be executed by an ECU of the vehicle.

FIG. 10 is a flowchart illustrating an example of a process to be executed by the ECU 150 of the vehicle 50. The process in this flowchart is started when the vehicle 50 transmits the approval signal S11 (FIG. 1) to the server 600 when a travel route for the vehicle 50 is set.

With reference to FIG. 10, the ECU 150 determines whether a DR period has arrived (step S215). The ECU 150 executes this determination process in accordance with the contract information stored in a storage device 153 of the vehicle 50. When a DR period has not arrived yet (NO in step S215), the ECU 150 executes this determination process until a DR period arrives. When a DR period has arrived (YES in step S215), on the other hand, the ECU 150 proceeds to step S218.

Then, the ECU 150 determines whether a power transmission enablement condition is met (step S218). This condition is met when power transmission between the vehicle 50 and power equipment (e.g. the power stand 40, the power equipment 45B, or the power equipment 45C) is enabled. For example, when the vehicle 50 is a vehicle 50A, the power transmission enablement condition is met when the connector 43 is inserted into the inlet 110. When the vehicle 50 is a vehicle 50B or a vehicle 50C, the power transmission enablement condition is met when the distance between the vehicle 50B or the vehicle 50C and the power equipment 45B or the power equipment 45C is less than a threshold distance at which the vehicle can receive power from the power equipment.

When the power transmission enablement condition is not met (NO in step S218), the ECU 150 executes the above determination process until the condition is met. When the power transmission enablement condition is met (YES in step S218), on the other hand, the ECU 150 proceeds to step S220.

Then, the ECU 150 executes power transmission (e.g. contact charge, non-contact charge while being stationary, or non-contact charge while traveling) in order for the vehicle 50 to participate in a DR (step S220). The power transmission is continued until the DR period is ended.

As described above, the processing device 605 of the server 600 according to the present embodiment selects a target vehicle, to which the DR signal S1 is to be transmitted by the communication device 630, from among the vehicles 50 in accordance with the priority degree p for participation in a DR. The processing device 605 sets the priority degree p of the vehicles 50ad to be higher than the priority degree p of the vehicles 50ef, and sets the priority degree p of the vehicles 50ef to be higher than the priority degree p of the vehicles 50g.

With such a configuration, the DR signal S1 is preferentially transmitted to the vehicles 50ad over the vehicles 50ef and the vehicles 50g, and preferentially transmitted to the vehicles 50ef over the vehicles 50g. This makes it easier for the vehicles 50ad to participate in a DR than for the vehicles 50ef and the vehicles 50g, and makes it easier for the vehicles 50ef to participate in a DR than for the vehicles 50g. As a result, it is possible to reduce the power loss L caused when a DR is performed compared to the case where the priority degree p is not set as described above. Thus, it is possible to adjust the power demand-supply balance while effectively using power.

First Modification of Embodiment

FIG. 11 indicates how a server 600 according to a first modification selects a target vehicle from among the vehicle group 500 upon receiving an adjustment request ARE.

With reference to FIG. 11, a graph 320 and a graph 330 are similar to the graph 220 and the graph 230 (FIG. 7), respectively.

A graph 340 illustrates how the server 600 according to the first modification selects a target vehicle when the adjustment request power amount RA during the period P1 is VafT or more. This example indicates a case where the penalty PT received by the aggregator when the adjustment request power amount RA is not achieved is less than a threshold THPT.

In this case, the server 600 sets the priority degree p of the vehicles 50ad, the vehicles 50ef, and the vehicles 50g such that only the vehicles 50ad and the vehicles 50ef, among the vehicles 50ad, the vehicles 50ef, and the vehicles 50g, are selected as a target vehicle. The server 600 sets the priority degree p of the vehicles 50ad and the vehicles 50ef to "high" and "medium", respectively, and sets the priority degree p of the vehicles 50g to "lowest", for example. As a result, the vehicles 50g are excluded from candidates for a target vehicle.

Consequently, only the vehicles 50ad and the vehicles 50ef may be selected as a target vehicle. As a result, the DR signal S1 may be transmitted to only the vehicles 50ad and the vehicles 50ef. Hence, only the vehicles 50ad and the vehicles 50ef may participate in a DR. Thus, a situation in which the vehicles 50g that cause a large power loss L compared to the vehicles 50ad and the vehicles 50ef participate in a DR is avoided.

In this example, the power amount (VafT) that can be achieved by the server 600 by using only the vehicles 50ad, 50ef is less than the adjustment request power amount RA by ΔV1.

When ΔV1 is small enough to be ignorable from a practical point of view, failure to achieve the adjustment request power amount RA may have little effect on the power demand-supply balance. That is, the power demand-supply balance is occasionally substantially kept even if the aggregator receives a penalty. Hence, a situation in which a power loss is increased because of non-contact power transmission while traveling can be avoided while substantially keeping the power demand-supply balance even when only the vehicles 50ad, 50ef are selected as a target vehicle.

Further, there is practically no problem from the viewpoint of the profit of the aggregator, since the penalty PT is less than the threshold THPT.

When the penalty PT is the threshold THPT or more such as when ΔV1 is so large as not to be ignorable, on the other hand, the server 600 may select the vehicles 50g as a target vehicle as in the case of the embodiment discussed earlier (FIG. 7). Consequently, a situation in which the aggregator receives a large penalty PT can be avoided.

A graph 345 illustrates how the server 600 according to the first modification selects a target vehicle when the adjustment request power amount RA during the period P1 is VadT or more. This case corresponds to the case where the penalty PT is less than the threshold THPT as with the graph 340.

In this case, the server 600 may set the priority degree p of the vehicles 50ad, the vehicles 50ef, and the vehicles 50g such that only the vehicles 50ad, among the vehicles 50ad, the vehicles 50ef, and the vehicles 50g, are selected as a target vehicle. The server 600 sets the priority degree p of the vehicles 50ad to be "high", and sets the priority degree p of the vehicles 50ef and the vehicles 50g to be "lowest", for example. Hence, the vehicles 50ef and the vehicles 50g are excluded from candidates for a target vehicle.

Consequently, only the vehicles 50ad are selected as a target vehicle. As a result, the DR signal S1 is transmitted to only the vehicles 50ad. Hence, only the vehicles 50ad participate in a DR. Thus, a situation in which the vehicles 50ef and the vehicles 50g that cause a large power loss L compared to the vehicles 50ad participate in a DR is avoided.

In this example, the power amount (VadT) that can be achieved by the server 600 by using only the vehicles 50ad is less than the adjustment request power amount RA by ΔV2.

When ΔV2 is small enough to be ignorable from a practical point of view, there is occasionally substantially no problem from the viewpoint of the power demand-supply balance and the profit of the aggregator as discussed earlier.

When the penalty PT is the threshold THPT or more such as when ΔV2 is so large as not to be ignorable from a practical point of view, on the other hand, the server 600 may select the vehicles 50ef as a target vehicle as in the case of the graph 330 (FIG. 7).

The procedure of the process by the server 600 according to the first modification will be described below. The procedure of this process is basically the same as the procedure (FIG. 8) of the process according to the embodiment discussed earlier, but is different from FIG. 9 in the details of step S115.

Figure 12:
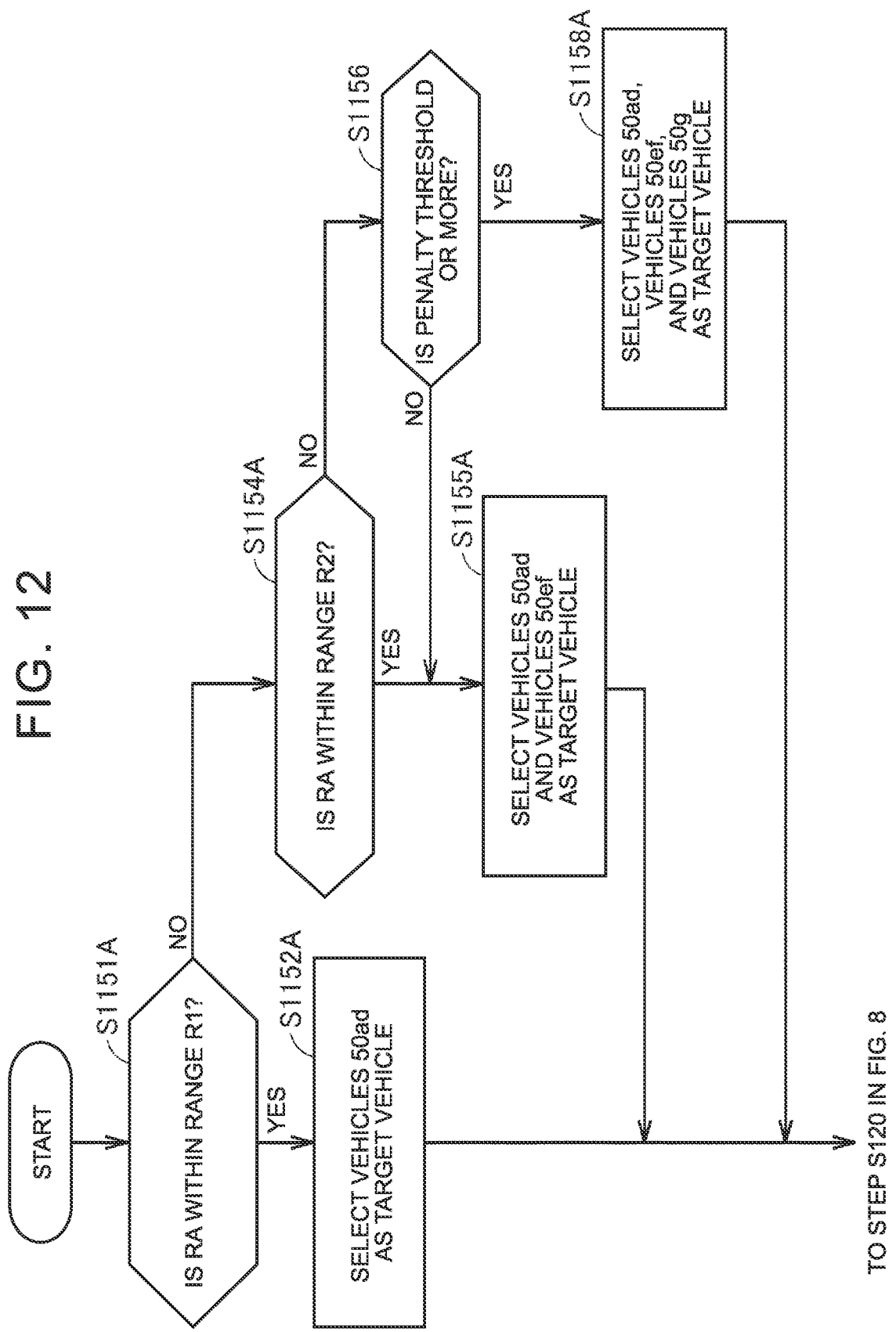
FIG. 12 is a flowchart according to the first modification, illustrating another example of the details of a process (step S115 in FIG. 8) of selecting a target vehicle in accordance with the priority degree.

FIG. 12 is a flowchart according to the first modification, illustrating another example of the details of a process (step S115 in FIG. 8) of selecting a target vehicle in accordance with the priority degree p.

With reference to FIG. 12, this flowchart is different from the flowchart in FIG. 9 in that a process in step S1156 has been added. Steps S1151A to S1155A and S1158A are the same as steps S1151 to S1155 and S1158 (FIG. 9), respectively.

When the adjustment request power amount RA is outside the range R2 (NO in step S1154A), the processing device 605 determines whether the penalty PT is the threshold THPT or more (step S1156).

When the penalty PT is less than the threshold THPT, the process proceeds to step S1155A. Then, the processing device 605 selects the vehicles 50ad and the vehicles 50ef as a target vehicle (graph 340). When the penalty PT is the threshold THPT or more, on the other hand, the process proceeds to step S1158A. Then, the processing device 605 selects the vehicles 50ad, the vehicles 50ef, and the vehicles 50g as a target vehicle (graph 240).

Second Modification of Embodiment

In the embodiment and the first modification discussed earlier, the priority degree p of the vehicles 50ad that belong to the group 500ad (FIG. 6) is equal (pa=pb=pc=pd in FIG. 5).

In a second modification, the priority degree p of the vehicles 50 in the group 500ad is different in accordance with the DR participation mode information 672. Specifically, the processing device 605 sets the priority degree p of the vehicles 50ad to be high when the vehicles 50ad cannot execute non-contact power transmission while being stationary or non-contact power transmission while traveling, compared to when the vehicles 50ad can further execute at least one of non-contact power transmission while being stationary and non-contact power transmission while traveling. In other words, the processing device 605 sets the priority degree p of the vehicles 50 to be high when the vehicles 50 in the group 500ad are the vehicles 50d (FIG. 6), compared to when the vehicles 50 in the group 500ad are the vehicles 50a, the vehicles 50b, or the vehicles 50c.

The vehicles 50a, the vehicles 50b, and the vehicles 50c can participate in a DR through not only contact power transmission but also non-contact power transmission while being stationary or non-contact power transmission while traveling. Hence, the vehicles 50a, the vehicles 50b, and the vehicles 50c have more choices (e.g. candidates for a location at which power transmission may be executed) for power transmission for participation in a DR than the vehicles 50d.

When the priority degree p is set as described above, the priority degree p of the vehicles 50d is higher than the priority degree p of the vehicles 50a, the vehicles 50b, and the vehicles 50c. Hence, the vehicles 50d that have a relatively small number of choices for power transmission tend to be selected as a target vehicle compared to the vehicles 50a, the vehicles 50b, and the vehicles 50c that have a relatively large number of choices for power transmission. Consequently, the processing device 605 can select a target vehicle from among the vehicles 50a, the vehicles 50b, and the vehicles 50c which have a large number of choices for power transmission, even when the prediction result of the power demand-supply balance is varied abruptly after the DR signal S1 is transmitted to the vehicles 50d which have a small number of choices for power transmission. As a result, it is possible to flexibly handle abrupt variations in the prediction result of the power demand-supply balance.

The processing device 605 may set the priority degree p of the vehicles 50ad to be high when the vehicles 50ad can further execute at least one of non-contact power transmission while being stationary and non-contact power transmission while traveling, compared to when the vehicles 50ad can further execute both non-contact power transmission while being stationary and non-contact power transmission while traveling. In other words, the processing device 605 may set the priority degree p of the vehicles 50 to be high when the vehicles 50 in the group 500ad are the vehicles 50b or the vehicles 50c (FIG. 6), compared to when the vehicles 50 in the group 500ad are the vehicles 50a.

The vehicles 50a have still more choices for power transmission for participation in a DR than the vehicles 50b and the vehicles 50c. When the priority degree p of the vehicles 50b and the vehicles 50c is set to be higher than the priority degree p of the vehicles 50a, the vehicles 50b and the vehicles 50c tend to be selected as a target vehicle compared to the vehicles 50a. Consequently, the processing device can select a target vehicle from among the vehicles 50a that have a relatively large number of choices for power transmission, even when the prediction result of the power demand-supply balance is varied abruptly after the DR signal is transmitted to the vehicles 50b and the vehicles 50c. As a result, it is possible to further flexibly handle abrupt variations in the prediction result of the power demand-supply balance.

Figure 13:
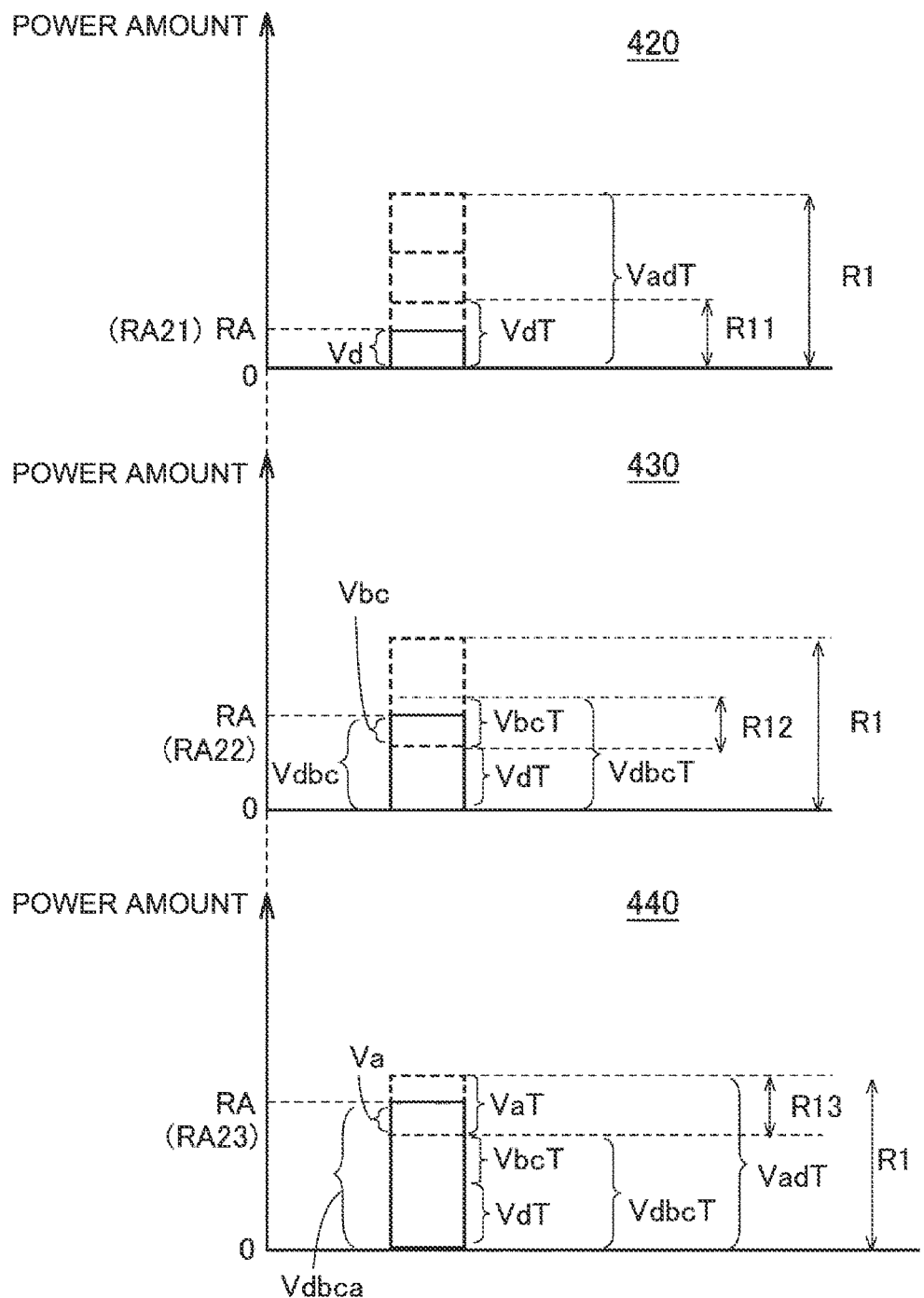
FIG. 13 indicates how a server according to a second modification selects a target vehicle from among a vehicle group upon receiving an adjustment request.

FIG. 13 indicates how a server 600 according to the second modification selects a target vehicle from among the vehicle group 500 upon receiving an adjustment request ARE. FIGS. 5 and 6 will be referenced as appropriate in the following description.

With reference to FIG. 13, a graph 420 illustrates how the server 600 selects a target vehicle when the adjustment request power amount RA during the period P1 is within a range R11 of 0 or more and less than VdT. This case corresponds to the case where the server 600 selects the vehicles 50d (FIG. 5) as a target vehicle, among the vehicles 50a to 50d, in order to adjust the power demand-supply balance. VdT is the maximum amount of power (total of the DR amounts dra of all the vehicles 50d) that can be consumed in the power system PG by the vehicles 50d during the period P1.

When the adjustment request power amount RA is within the range R11, the server 600 selects at least one vehicle 50d as a target vehicle, from among the group 500d, so that the adjustment request power amount RA is consumed in the power system PG during the period P1. In this example, the server 600 executes this selection process so that the total (Vd) of the DR amounts dra of the at least one vehicle 50d reaches the adjustment request power amount RA (=RA21).

A graph 430 illustrates how the server 600 selects a target vehicle when the adjustment request power amount RA during the period P1 is within a range R12 of VdT or more and less than VdbcT (to be discussed later). This case corresponds to the case where the server 600 selects the vehicles 50b and the vehicles 50c in addition to the vehicles 50d as a target vehicle, among the vehicles 50a to 50d, in order to adjust the power demand-supply balance.

In this example, the adjustment request power amount RA has a value of RA22, which is larger than VdT. VbcT is the maximum amount of power (total of the DR amounts dra of all the vehicles 50b and the vehicles 50c) that can be consumed in the power system PG by the vehicles 50b and the vehicles 50c during the period P1. VdbcT is the total of VdT and VbcT.

When the adjustment request power amount RA is within the range R12, the server 600 selects all the vehicles 50d as a target vehicle, and selects at least one vehicle 50 (vehicle 50b or vehicle 50c) as a target vehicle from among the group 500bc, so that the adjustment request power amount RA is consumed in the power system PG during the period P1. The server 600 executes this selection process so that the sum Vdbc of the total (Vbc) of the DR amounts dra of the at least one vehicle 50 and VdT reaches the adjustment request power amount RA (=RA22), for example.

A graph 440 illustrates how the server 600 selects a target vehicle when the adjustment request power amount RA during the period P1 is within a range R13 of VdbcT or more and less than VadT. This case corresponds to the case where the server 600 selects the vehicles 50a in addition to the vehicles 50b, 50c, 50d as a target vehicle, among the vehicles 50a to 50d, in order to adjust the power demand-supply balance.

In this example, the adjustment request power amount RA has a value of RA23, which is larger than VdbcT. VaT is the maximum amount of power (total of the DR amounts dra of all the vehicles 50a) that can be consumed in the power system PG by the vehicles 50a during the period P1.

When the adjustment request power amount RA is within the range R13, the server 600 selects all the vehicles 50b, 50c, 50e as a target vehicle, and selects at least one vehicle 50a as a target vehicle from among the group 500a, so that the adjustment request power amount RA is consumed in the power system PG during the period P1. The server 600 executes this selection process so that the sum Vdbca of the total (Va) of the DR amounts dra of the at least one vehicle 50a and VdbcT reaches the adjustment request power amount RA (=RA23), for example.

Figure 14:
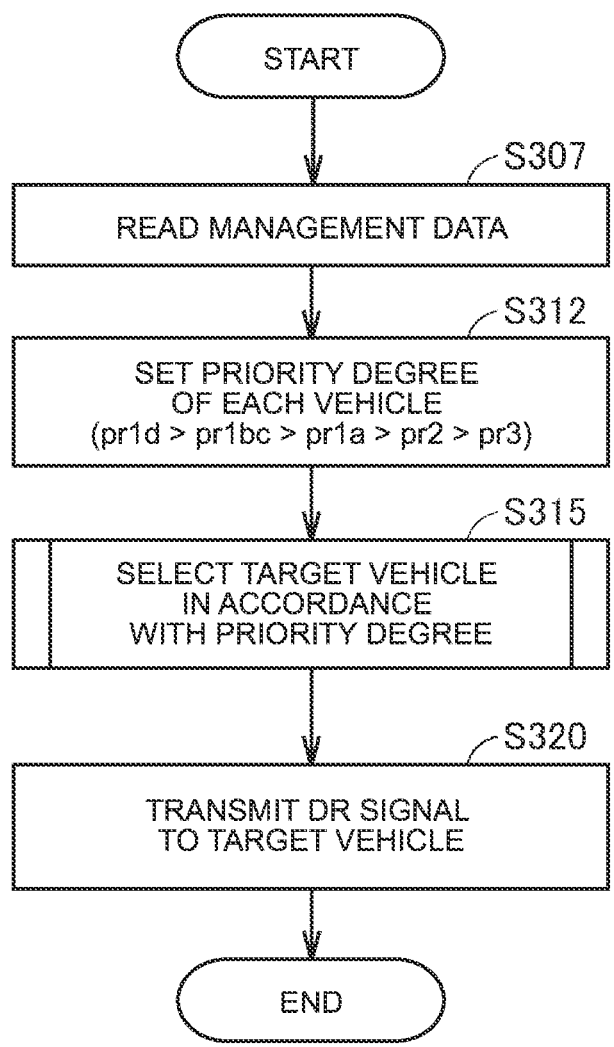
FIG. 14 is a flowchart illustrating an example of a process to be executed by the server according to the second modification.

FIG. 14 is a flowchart illustrating an example of a process to be executed by the server 600 according to the second modification. This flowchart is started when the server 600 receives the adjustment request ARE (FIG. 1).

With reference to FIG. 14, this flowchart is different from the flowchart in FIG. 8 in that the processes in steps S312 and S315 are executed in place of the processes in steps S110 and S115, respectively. The processes in steps S307 and S320 are the same as the processes in steps S107 and S120 (FIG. 8), respectively.

The server 600 sets a priority degree p (in other words, priority degree information 675) of each vehicle 50 in accordance with the ID information 671 and the DR participation mode information 672 of the management data 670 (step S312).

In this example, the server 600 sets the priority degree p (=pr1d) of the vehicles 50d to be higher than the priority degree p (=pr1bc) of the vehicles 50b, 50c. Further, the server 600 sets the priority degree p of the vehicles 50bc to be higher than the priority degree p (=pr1a) of the vehicles 50a (pr1d>pr1bc>pr1a). pr2, pr3 are the same as those in the embodiment and the modification discussed earlier.

Then, the server 600 selects a target vehicle in accordance with the priority degree p of each vehicle 50 that has been set (step S315). This process will be described in detail below with reference to FIG. 15.

FIG. 15 is a flowchart according to the second modification, illustrating the details of a process (step S315 in FIG. 14) of selecting a target vehicle in accordance with the priority degree p. In the following description, FIG. 13 will be referenced as appropriate.

With reference to FIG. 15, the processing device 605 of the server 600 determines whether the adjustment request power amount RA is within the range R11 (step S3151).

When the adjustment request power amount RA is within the range R11 (YES in step S3151), the processing device 605 selects the vehicles 50d as a target vehicle from among the vehicle group 500 in accordance with the priority degree p (pr1d>pr1bc>pr1a>pr2>pr3) of each vehicle 50 (step S3152). That is, the processing device 605 preferentially selects the vehicles 50d with the highest priority degree p as a target vehicle from among the vehicles 50a to 50h (graph 420 in FIG. 13). After step S3152, the process proceeds to step S320 in FIG. 14.

When the adjustment request power amount RA is outside the range R11 (NO in S3151), on the other hand, the processing device 605 proceeds to step S3153.

Then, the processing device 605 determines whether the adjustment request power amount RA is within the range R12 (step S3153).

When the adjustment request power amount RA is within the range R12 (YES in step S3153), the processing device 605 selects the vehicles 50b and the vehicles 50c as a target vehicle, in addition to the vehicles 50d, from among the vehicle group 500 in accordance with the priority degree p of each vehicle 50 (step S3154). Specifically, the processing device 605 preferentially selects all the vehicles 50d and at least one vehicle 50b or vehicle 50c as a target vehicle from among the vehicles 50a to 50h (graph 430 in FIG. 13). After that, the process proceeds to step S320 in FIG. 14.

When the adjustment request power amount RA is outside the range R12 (NO in S3153), on the other hand, the processing device 605 proceeds to step S3155.

Then, the processing device 605 determines whether the adjustment request power amount RA is within the range R13 (step S3155). When the adjustment request power amount RA is within the range R13 (YES in step S3155), the processing device 605 selects the vehicles 50b, the vehicles 50c, the vehicles 50d, and the vehicles 50a as a target vehicle from among the vehicle group 500 in accordance with the priority degree p of each vehicle 50 (step S3156). Specifically, the processing device 605 preferentially selects the vehicles 50a to 50d as a target vehicle over the vehicles 50e to 50h, and preferentially selects the vehicles 50b to 50c as a target vehicle over the vehicles 50a (graph 440 in FIG. 13). In this case, the processing device 605 proceeds to step S320 in FIG. 14.

When the adjustment request power amount RA is outside the range R13 (NO in step S3155), on the other hand, it is assumed that the adjustment request power amount RA is within the range R2 or the range R3 (both in FIG. 7) in this example. In this case, the processing device 605 executes a process that is the same as step S1154 in FIG. 9. The subsequent processes are the same as the processes (steps S1155 and S1158) described in relation to FIG. 9.

While the priority degree p (pb, pc in FIG. 6) of the vehicles 50b, 50c is the same in the above description, the priority degree p may be different. The processing device 605 may set the priority degree p (pb) of the vehicles 50b, which cause a relatively small power loss during non-contact power transmission during the period P1, to be higher than the priority degree p (pc) of the vehicles 50c, which cause a relatively large power loss, for example.

Other Modifications

The adjustment request power amount RA (FIGS. 7 and 13) may be an amount of power required to be saved in the power system PG, or required to be supplied to the power system PG, by the power resource group 400 (e.g. the vehicle group 500). In this case, the DR amount of the vehicles 50 corresponds to the amount of power to be transmitted from the vehicles 50 to the power equipment, or the amount of power to be saved by the vehicles 50 (the amount of power by which the amount of power originally expected to be consumed is reduced). The server 600 selects at least one vehicle 50 as a target vehicle from among the vehicle group 500 such that the total of the amount of power to be transmitted or the amount of power to be saved for each target vehicle reaches the adjustment request power amount RA.

The embodiment disclosed herein should be considered to be illustrative and not restrictive in all respects. The scope of the present disclosure is indicated by the claims rather than the above description, and is intended to include all modifications within the meaning and the scope equivalent to the claims.

What is claimed is:

1. A server that is used by an aggregator to manage a plurality of vehicles each configured to be able to participate in a demand response (DR) for adjusting a power demand-supply balance in a power system,
the server comprising:
a communication device configured to be able to transmit a DR signal that requests participation in the DR to each of the vehicles; and
a processing device that selects a target vehicle, to which the DR signal is to be transmitted by the communication device, from among the vehicles in accordance with a priority degree for participation in the DR, wherein:
a first vehicle among the vehicles is configured to be able to participate in the DR by executing first power transmission to transmit power with a power stand that is external to the first vehicle through a power cable for the power stand;
a second vehicle among the vehicles is configured to be able to participate in the DR by executing second power transmission to transmit power in a non-contact manner with power equipment that is external to the second vehicle while the second vehicle is stationary;
a third vehicle among the vehicles is configured to be able to participate in the DR by executing third power transmission to transmit power in a non-contact manner with power equipment that is external to the third vehicle while the third vehicle is traveling; and
the processing device is configured to set the priority degree of the first vehicle to be higher than the priority degree of the second vehicle, and to set the priority degree of the second vehicle to be higher than the priority degree of the third vehicle.

2. The server according to claim 1, wherein the processing device sets the priority degree of the first vehicle, the second vehicle, and the third vehicle such that only the first vehicle and the second vehicle, among the first vehicle, the second vehicle, and the third vehicle, are selected as the target vehicle when a penalty to be imposed on the aggregator is less than a threshold.

3. The server according to claim 1, wherein the processing device sets the priority degree of the first vehicle, the second vehicle, and the third vehicle such that only the first vehicle, among the first vehicle, the second vehicle, and the third vehicle, is selected as the target vehicle when a penalty to be imposed on the aggregator is less than a threshold.

4. The server according to claim 2, wherein the penalty is an amount of power by which an amount of power transmitted from the first vehicle and the second vehicle to the power system during a predetermined period in which a DR is performed is short with respect to an adjustment request power amount that is necessary to adjust a demand-supply balance in the power system during the predetermined period in which the DR is performed.

5. The server according to claim 3, wherein the penalty is an amount of power by which an amount of power transmitted from the first vehicle to the power system during a predetermined period in which a DR is performed is short with respect to an adjustment request power amount that is necessary to adjust a demand-supply balance in the power system during the predetermined period in which the DR is performed.

6. The server according to claim 1, wherein the processing device sets the priority degree of the first vehicle to be high when the first vehicle is not able to execute the second power transmission or the third power transmission compared to when the first vehicle is able to further execute at least one of the second power transmission and the third power transmission.

7. The server according to claim 6, wherein the processing device sets the priority degree of the first vehicle to be high when the first vehicle is able to further execute one of the second power transmission and the third power transmission compared to when the first vehicle is able to further execute both the second power transmission and the third power transmission.

8. A power management system comprising:
a plurality of vehicles each configured to be able to participate in a demand response (DR) for adjusting a power demand-supply balance in a power system; and
a server that manages the vehicles,
the server comprising:
a communication device configured to be able to transmit a DR signal that requests participation in the DR to each of the vehicles; and
a processing device that selects a target vehicle, to which the DR signal is to be transmitted by the communication device, from among the vehicles in accordance with a priority degree for participation in the DR, wherein:
a first vehicle among the vehicles is configured to be able to execute first power transmission to transmit power with a power stand that is external to the first vehicle through a power cable for the power stand;
a second vehicle among the vehicles is configured to be able to execute second power transmission to transmit power in a non-contact manner with power equipment that is external to the second vehicle while the second vehicle is stationary;
a third vehicle among the vehicles is configured to be able to execute third power transmission to transmit power in a non-contact manner with power equipment that is external to the third vehicle while the third vehicle is traveling; and
the processing device is configured to set the priority degree of the first vehicle to be higher than the priority degree of the second vehicle, and to set the priority degree of the second vehicle to be higher than the priority degree of the third vehicle.

9. The power management system according to claim 8, wherein the processing device sets the priority degree of the first vehicle, the second vehicle, and the third vehicle such that only the first vehicle and the second vehicle, among the first vehicle, the second vehicle, and the third vehicle, are selected as the target vehicle when a penalty to be imposed on an aggregator is less than a threshold.

10. The power management system according to claim 8, wherein the processing device sets the priority degree of the first vehicle, the second vehicle, and the third vehicle such that only the first vehicle, among the first vehicle, the second vehicle, and the third vehicle, is selected as the target vehicle when a penalty to be imposed on an aggregator is less than a threshold.

11. The power management system according to claim 9, wherein the penalty is an amount of power by which an amount of power transmitted from the first vehicle and the second vehicle to the power system during a predetermined period in which a DR is performed is short with respect to an adjustment request power amount that is necessary to adjust a demand-supply balance in the power system during the predetermined period in which the DR is performed.

12. The power management system according to claim 10, wherein the penalty is an amount of power by which an amount of power transmitted from the first vehicle to the power system during a predetermined period in which a DR is performed is short with respect to an adjustment request power amount that is necessary to adjust a demand-supply balance in the power system during the predetermined period in which the DR is performed.

13. The power management system according to claim 9, wherein the processing device sets the priority degree of the first vehicle to be high when the first vehicle is not able to execute the second power transmission or the third power transmission compared to when the first vehicle is able to further execute at least one of the second power transmission and the third power transmission.

14. The power management system according to claim 13, wherein the processing device sets the priority degree of the first vehicle to be high when the first vehicle is able to further execute one of the second power transmission and the third power transmission compared to when the first vehicle is able to further execute both the second power transmission and the third power transmission.

* * * * *